US010182178B2

(12) United States Patent
Nakahara

(10) Patent No.: US 10,182,178 B2
(45) Date of Patent: Jan. 15, 2019

(54) PARALLEL FAST DRAWING OF UNROTATED DELTA ROW ENCODED IMAGES

(71) Applicant: Kyocera Document Solutions Inc., Osaka (JP)

(72) Inventor: Hideo Nakahara, Torrance, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/790,360

(22) Filed: Oct. 23, 2017

(65) Prior Publication Data

US 2018/0097970 A1   Apr. 5, 2018

Related U.S. Application Data

(63) Continuation-in-part of application No. 15/281,107, filed on Sep. 30, 2016, now Pat. No. 9,800,760.

(51) Int. Cl.
| G06F 15/00 | (2006.01) |
| G06K 1/00 | (2006.01) |
| G06K 15/00 | (2006.01) |
| H04N 1/417 | (2006.01) |
| H04N 19/597 | (2014.01) |
| G06K 15/02 | (2006.01) |
| H04N 1/41 | (2006.01) |
| H04N 1/64 | (2006.01) |
| G06T 9/00 | (2006.01) |

(Continued)

(52) U.S. Cl.
CPC ....... *H04N 1/4175* (2013.01); *G06K 15/1817* (2013.01); *G06K 15/1822* (2013.01); *G06K 15/1842* (2013.01); *G06K 15/1843* (2013.01); *G06K 15/1857* (2013.01); *H04N 1/41* (2013.01); *H04N 1/642* (2013.01); *H04N 19/597* (2014.11); *G06T 9/005* (2013.01); *H04N 19/436* (2014.11); *H04N 19/44* (2014.11)

(58) Field of Classification Search
CPC .. H04N 1/4175; H04N 19/597; H04N 19/436; H04N 19/44; G06T 9/005
USPC .. 358/1.16, 1.1, 1.9, 426.01, 426.02, 426.05
See application file for complete search history.

(56) References Cited

U.S. PATENT DOCUMENTS

| 8,351,719 B2 | 1/2013 | Horikoshi | |
| 2008/0109815 A1* | 5/2008 | Murata | G06F 9/5027 |
| | | | 718/105 |
| 2017/0186224 A1* | 6/2017 | Diard | G06T 15/80 |

FOREIGN PATENT DOCUMENTS

JP   2002-152048 A   5/2002

* cited by examiner

*Primary Examiner* — Douglas Tran
(74) *Attorney, Agent, or Firm* — HEA Law PLLC

(57) ABSTRACT

A method using L processors includes: receiving image data encoded by delta row encoding; dividing the two dimensionally arranged plurality of pixels by M (M≤L) to make M blocks of pixels; assigning M processors to perform a parallel processing of accumulating the delta data for all the row lines of each of the M blocks of the image data to obtain the accumulated delta data, the accumulated delta data including a total delta between the first row line and the last row line in each of the blocks; obtaining the first row lines in the respective blocks using the total delta one by one starting from the second block; and assigning M+1 processors to perform a parallel processing of decoding using the obtained first row lines to obtain the decoded data and a parallel processing of rendering the image data using the decoded data.

18 Claims, 27 Drawing Sheets

(51) Int. Cl.
*H04N 19/436* (2014.01)
*H04N 19/44* (2014.01)

FIG. 2

Original image data

FIG. 3

Delta Row Encoding

FIG. 7

Result of Parallel Delta-Accumulating Process

Updating Last Line of Second Block

FIG. 10

Decoded Result

PARALLEL FAST DRAWING OF UNROTATED DELTA ROW ENCODED IMAGES

BACKGROUND

Unless otherwise indicated herein, the description in this section is not prior art to the claims in this application and is not admitted to be prior art by inclusion in this section.

This disclosure is related with an image-forming apparatus having a printing function such as printers, copiers, facsimile machines, and multi-function peripheral (MFP) having the functions of these apparatus. The image-forming apparatus processes images with high resolutions, which consume a large memory area. The memory area is saved by converting a print job of each page into intermediate codes after being divided into a plurality of bands. The intermediate codes are stored in the memory area while the image printing is performed on a page-by-page basis by rasterizing the stored intermediate codes into a bit image. Meanwhile, central processing units (CPUs) having a plurality of independent actual processing units (which are called "cores") have been widely employed for the image-forming apparatuses, recently.

SUMMARY

A method according to one aspect of the disclosure use L (L is two or more) processors. The method includes: receiving, at a computing device, image data encoded by delta row encoding, the image data indicating two dimensionally arranged plurality of pixels, the image data including delta data indicating difference between $N^{th}$ row line and $(N-1)^{th}$ row line in the two dimensionally arranged plurality of pixels; dividing the two dimensionally arranged plurality of pixels by M (M equals to L or less) in a column direction to make M blocks of pixels including the first block to $M^{th}$ block; assigning M processors to perform a parallel processing of accumulating the delta data for all the row lines of each of the M blocks of the image data to obtain the accumulated delta data, the accumulated delta data including a total delta between the first row line and the last row line in each of the blocks; obtaining the first row lines in the respective blocks using the total delta one by one starting from the second block; assigning M+1 processers to perform a parallel processing of decoding using the obtained first row lines to obtain the decoded data; and assigning M+1 processers to perform a parallel processing of rendering the image data using the decoded data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates a schematic drawing representing a typical delta row encoding according to Embodiment 1.

FIG. 3 illustrates a typical delta row encoded data according to Embodiment 1.

FIG. 7 illustrates a schematic drawing representing a result of parallel delta-accumulating process according to Embodiment 1.

FIG. 8 illustrates a schematic drawing representing an updating process of the first row of the second block according to Embodiment 1.

FIG. 9 illustrates a schematic drawing representing an updating process of the last row of the second block according to Embodiment 1.

FIG. 10 illustrates a schematic drawing representing an updating process of the remaining first row according to Embodiment 1.

DETAILED DESCRIPTION

Figure 1:
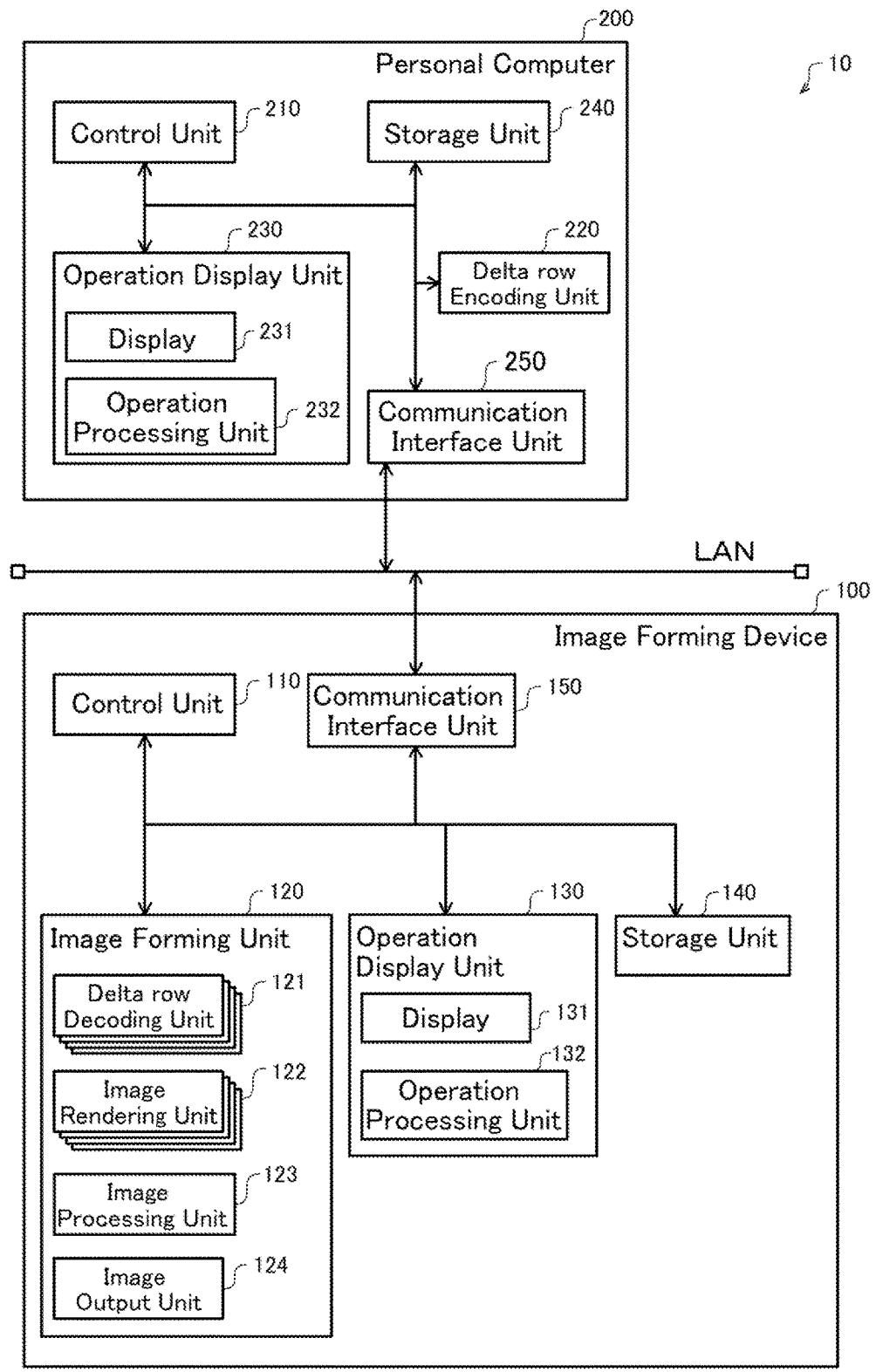
FIG. 1 illustrates a block diagram representing a functional configuration of an image forming system 10 according to Embodiment 1 of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiments") with reference to the drawings.

FIG. 1 illustrates a block diagram representing a functional configuration of an image forming system 10 according to Embodiment 1 of the disclosure. The image forming system 10 includes an image forming device 100 and a personal computer 200. The personal computer 200 is connected to the image forming device 100 via a network (which is a LAN in this example).

The image forming device 100 includes a control unit 110, an image forming unit 120, an operation display unit 130, a storage unit 140, and a communication interface unit 150. The personal computer 200 includes a control unit 210, a delta row encoding unit 220, an operation display unit 230, a storage unit 240, and a communication interface unit 250. The delta row encoding unit 220 encodes image data to generate encoded image data using a delta row encoding.

The communication interface unit 150 and the communication interface unit 250 communicate using a transmission control protocol/Internet protocol (TCP/IP) suite. The communication interface unit 150 functions as a print data receiver in this embodiment. The print data receiver may receive print data via a discrete I/O interface.

The image forming unit 120 includes four delta row decoding units 121, four image rendering units 122, an image processing unit 123, and an image output unit 124. The delta row decoding unit 121 decodes the encoded image data by an inverse delta row encoding. The image rendering unit 122 renders the decoded image data to generate bit map data of the image. The image processing unit 123 processes the scan data in accordance with a print setting. The image output unit 124 prints an image on a printing medium based on the decoded print data. The image output unit 124 functions as a print executing unit.

The four delta row decoding units 121 and the four image rendering units 122 are achieved with a CPU including a plurality of cores for ensuring parallel processing. The number of cores is four in this embodiment. Alternatively, four CPUs may be employed for the four delta row decoding units 121 and the four image rendering units 122.

The operation display unit 130 of the image forming device 100 includes a display 131 and an operation processing unit 132. The operation display unit 230 of the personal computer 200 includes a display 231 and an operation processing unit 232. The display 131, which functions as a touch panel, displays various menus as a receiving screen. The operation processing units 132 and 232 accept an input operation of a user from the displays 131 and 231, which function as a touch panel, and various kinds of buttons and switches (not illustrated).

The control units 110 and 210 include a main storage unit such as a RAM and a ROM, and a control unit such as a micro-processing unit (MPU) and a central processing unit (CPU). The control units 110 and 210 also include a controller function related to an interface such as various kinds of I/Os, a universal serial bus (USB), a bus, and other hardware, and control the entire image forming device 100 and the entire personal computer 200, respectively.

The storage units 140 and 240 are storage devices formed of such as a hard disk drive and a flash memory, which are non-transitory recording mediums, and store control programs and data of processes performed by the control units 110 and 210, respectively.

Figure 2:
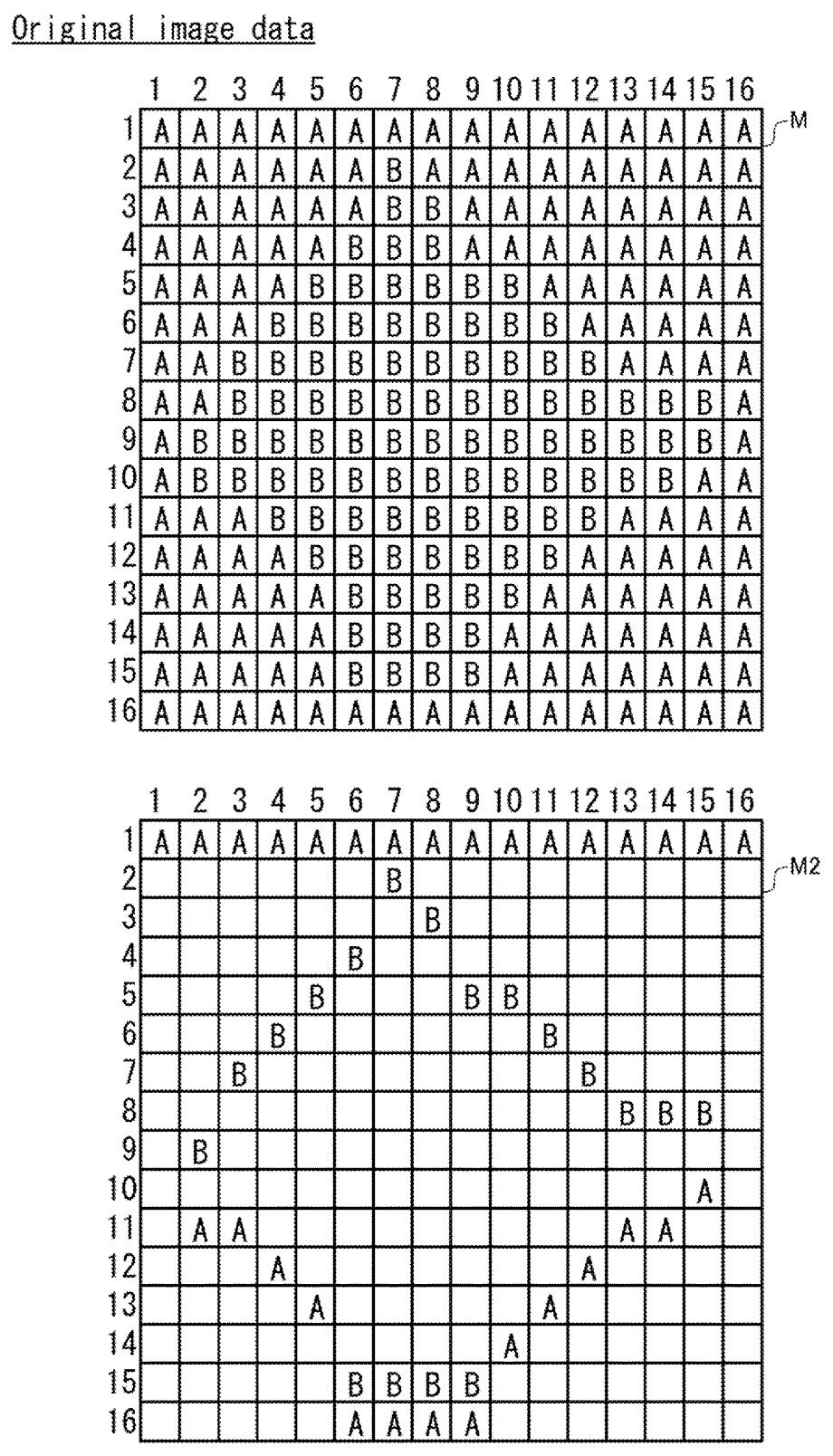

FIG. 2 illustrates a schematic drawing representing a typical delta row encoding according to Embodiment 1. FIG. 2 illustrates an original image data to be encoded and its encoded data. The delta row encoding (also referred to as delta compression) is a method of converting the original data in the form of differences (deltas) between sequential rows of data rather than complete data. The alphabets in pixels mean the respective colors of the pixels. The same alphabets indicate the same colors. The pixels in the first row include the alphabets of "A," while the pixels in the second row include the alphabets of "A" and "B."

Figure 3:
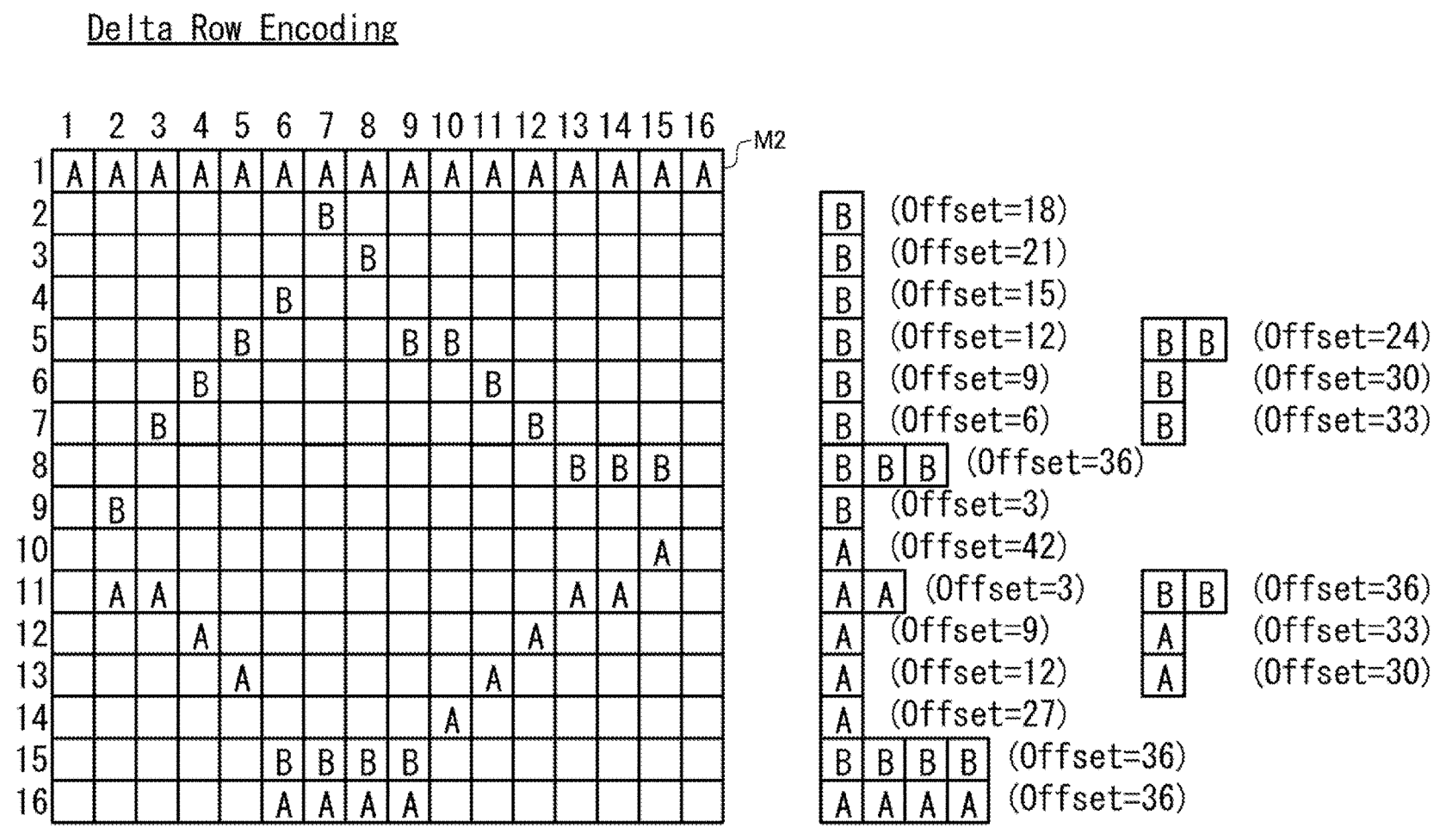

FIG. 3 illustrates a typical delta row encoded data according to Embodiment 1. The original image data includes 16 rows of pixel data, and the 16 rows each include 16 pixel data. The first row in the original data and the encoded data each include complete 16 pixel data of "A." The second row in the encoded data includes only the one pixel of data "B" and its offset to specify the location of the pixel of data "B." The second encoded row data includes a part of image with an offset number of 18, which is calculated by 6 pixels times 3 colors for RGB. The remaining pixel data of the second row are the same as the pixel data of the first row.

Figure 4:
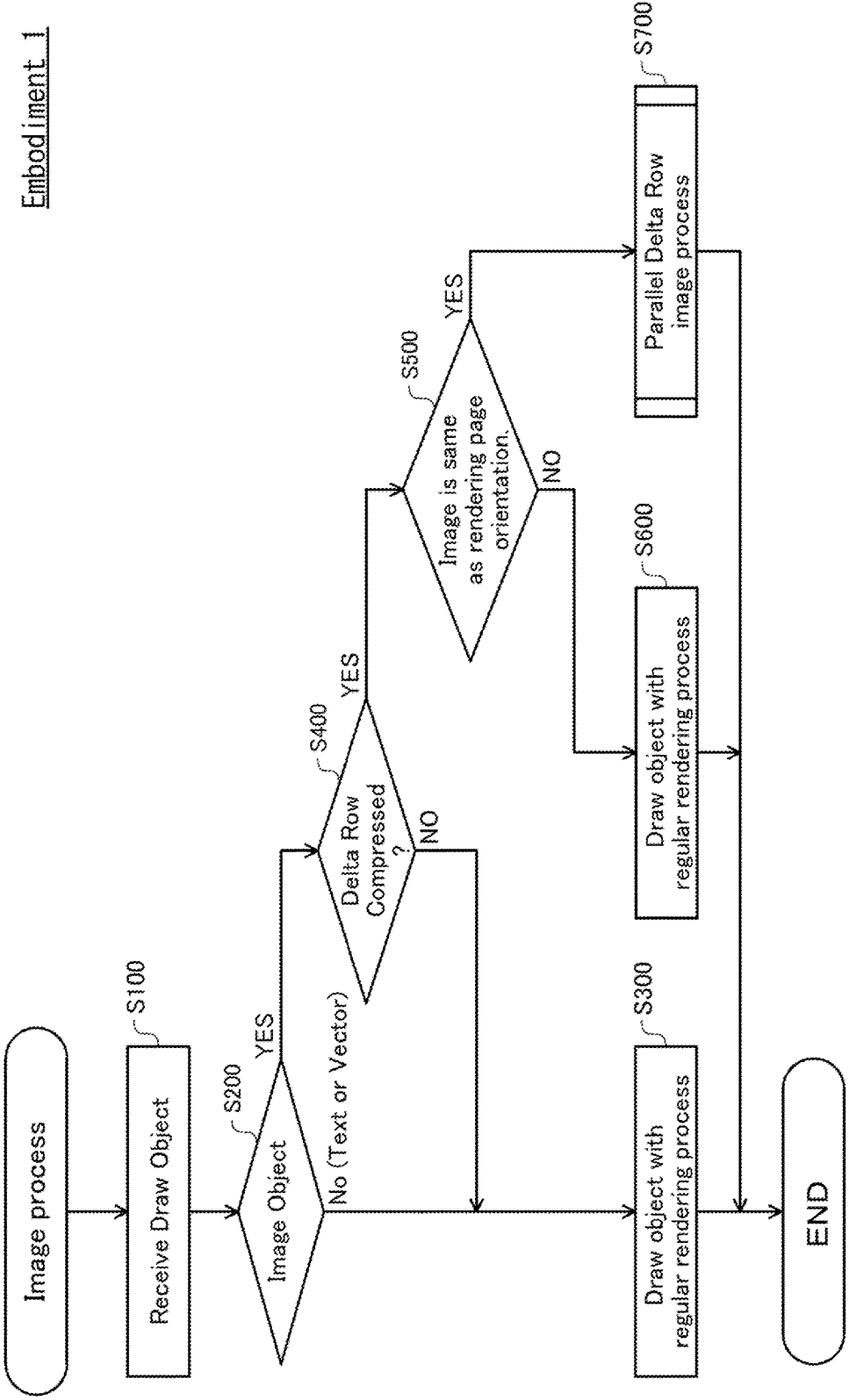
FIG. 4 illustrates a flow chart representing an image process according to Embodiment 1.

FIG. 4 illustrates a flow chart representing an image process according to Embodiment 1. At Step S100, the image forming device 100 receives a drawing object from the personal computer 200 using the communication interface unit 250 via the communication interface unit 150.

At Step S200, the image forming unit 120 analyzes the received drawing object to find whether the received drawing object is an image object or not. If the received drawing object is found to be an image object, the image forming unit 120 advances the process to Step S400. If the received drawing object is found to be an object, such as text and vector data, other than an image object, the image forming unit 120 advances the process to Step S300. At Step S300, the image forming unit 120 draws the object with a regular rendering process.

At Step S400, the image rendering unit 122 analyzes the received drawing object to find whether the received drawing object is compressed by delta row encoding. If the received drawing object is found to be compressed by delta row encoding, the image forming unit 120 advances the process to Step S500. If the received drawing object is not compressed by delta row encoding, the image forming unit 120 advances the process to Step S300.

At Step S500, the image rendering unit 122 analyzes the received drawing object to find whether the image has the same orientation as the rendering page orientation or unrotated. If the image has the same orientation, the image forming unit 120 advances the process to Step S700. If the image does not have the same orientation, the image forming unit 120 advances the process to Step S600. At Step S600, the image forming unit 120 draws the image object with a regular image rendering process.

Figure 5:
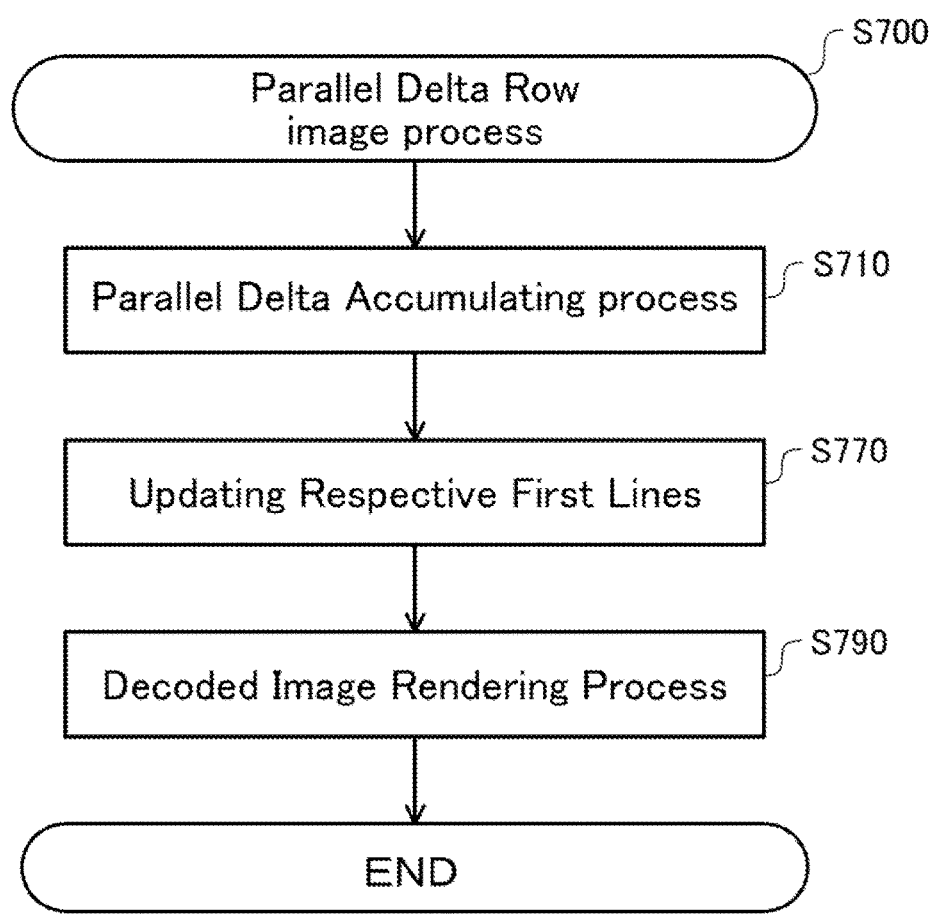
FIG. 5 illustrates a flow chart representing a parallel delta row image process according to Embodiment 1.

FIG. 5 illustrates a flow chart representing a parallel delta row image process according to Embodiment 1. At Step S700, the delta row decoding unit 121 performs a parallel delta row image process. At Step S710, one of the delta row decoding units 121 divides the encoded image data M2 (see FIG. 2) into four row blocks M21 to M24 (see FIG. 6) and then performs a parallel delta accumulating process. Each of the row blocks includes the four rows of pixel data.

Figure 6:
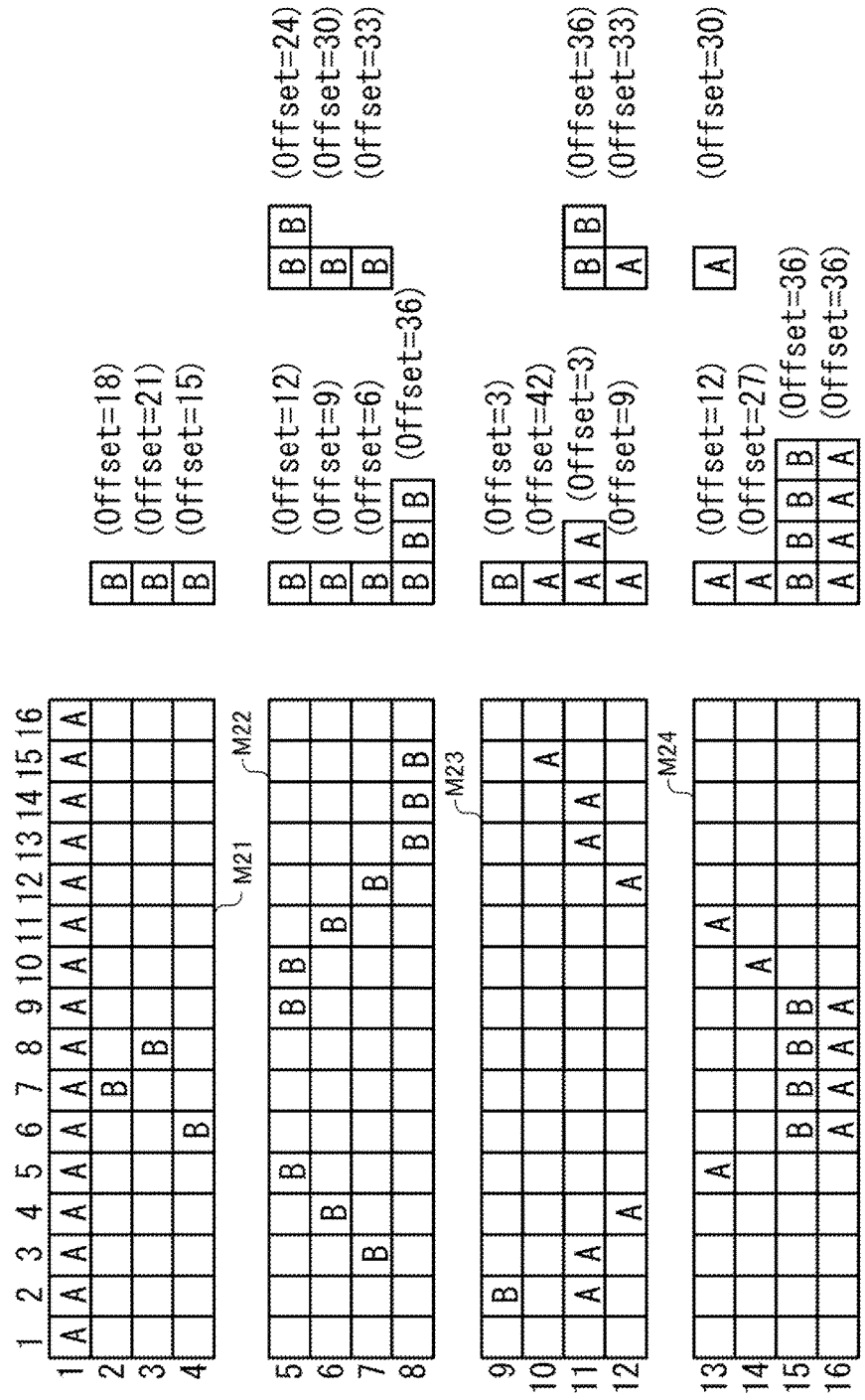
FIG. 6 illustrates a schematic drawing representing a parallel delta accumulating process according to Embodiment 1.

FIG. 6 illustrates a schematic drawing representing a parallel delta accumulating process according to Embodiment 1. In the parallel delta accumulating process, the respective delta row decoding units 121 accumulate deltas in the second row to the fourth row for the first row block, deltas in the sixth row to the eighth row for the second row block, and the tenth row to the twelfth row for the third row block.

Figure 7:
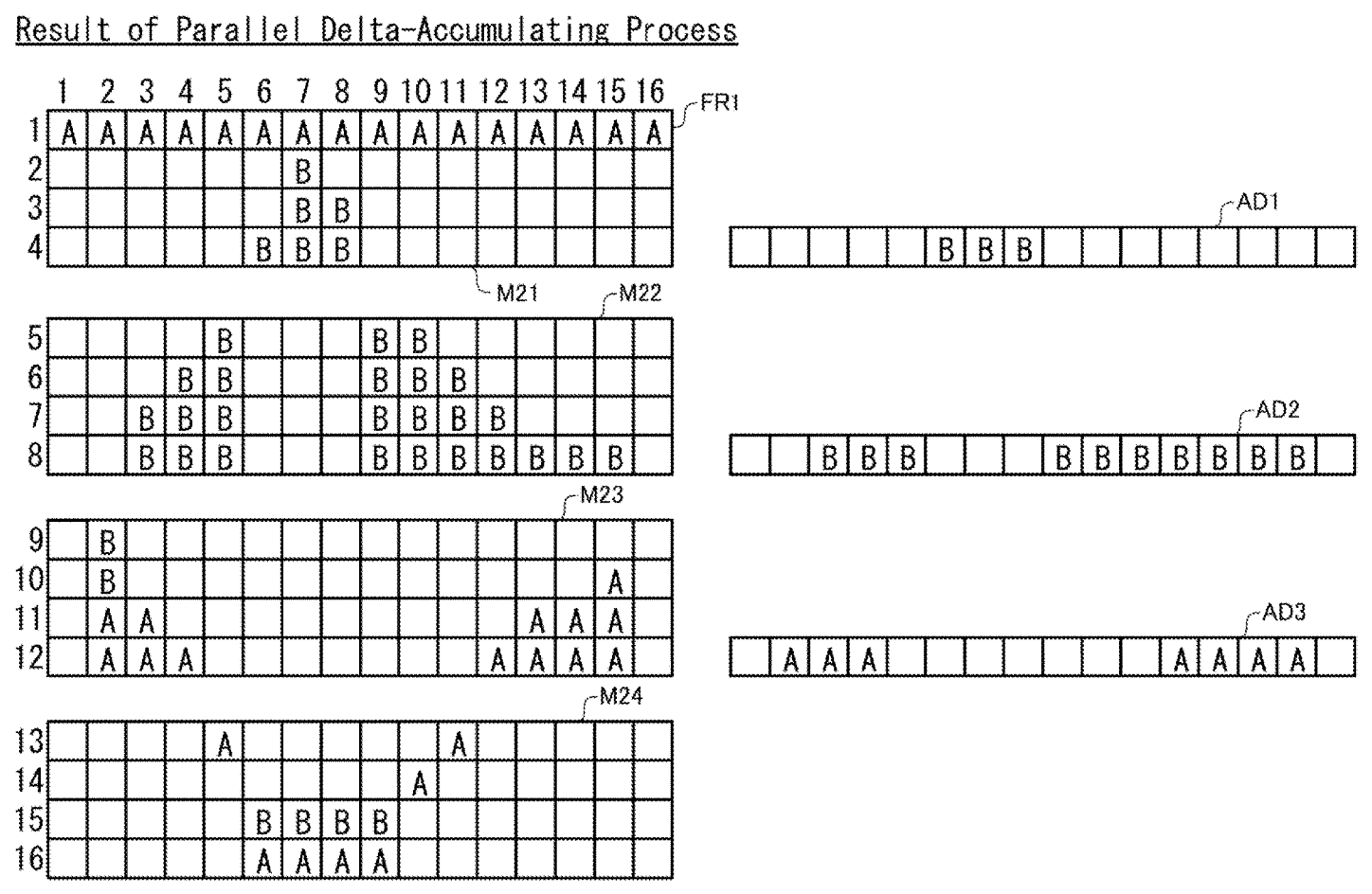

FIG. 7 illustrates a schematic drawing representing a result of parallel delta-accumulating process according to Embodiment 1. The respective delta row decoding units 121 perform a parallel delta accumulating process on the three row blocks M21 to M23 to obtain the respective last rows: the 4th accumulated delta row, the $8^{th}$ accumulated delta row, and the $12^{th}$ accumulated delta row.

The $4^{th}$ accumulated delta AD1 includes the total delta data as the difference between the first row FR1 and the last row in the first row block. The $8^{th}$ accumulated delta AD2 includes the total delta data as the difference between the first row and the last row in the second row block. The $12^{th}$ accumulated delta AD3 includes the total delta data as the difference between the first row and the last row in the third row block.

At Step S770, the delta row decoding unit 121 generates the respective first rows in the second to the fourth row block by updating process described below.

Figure 8:
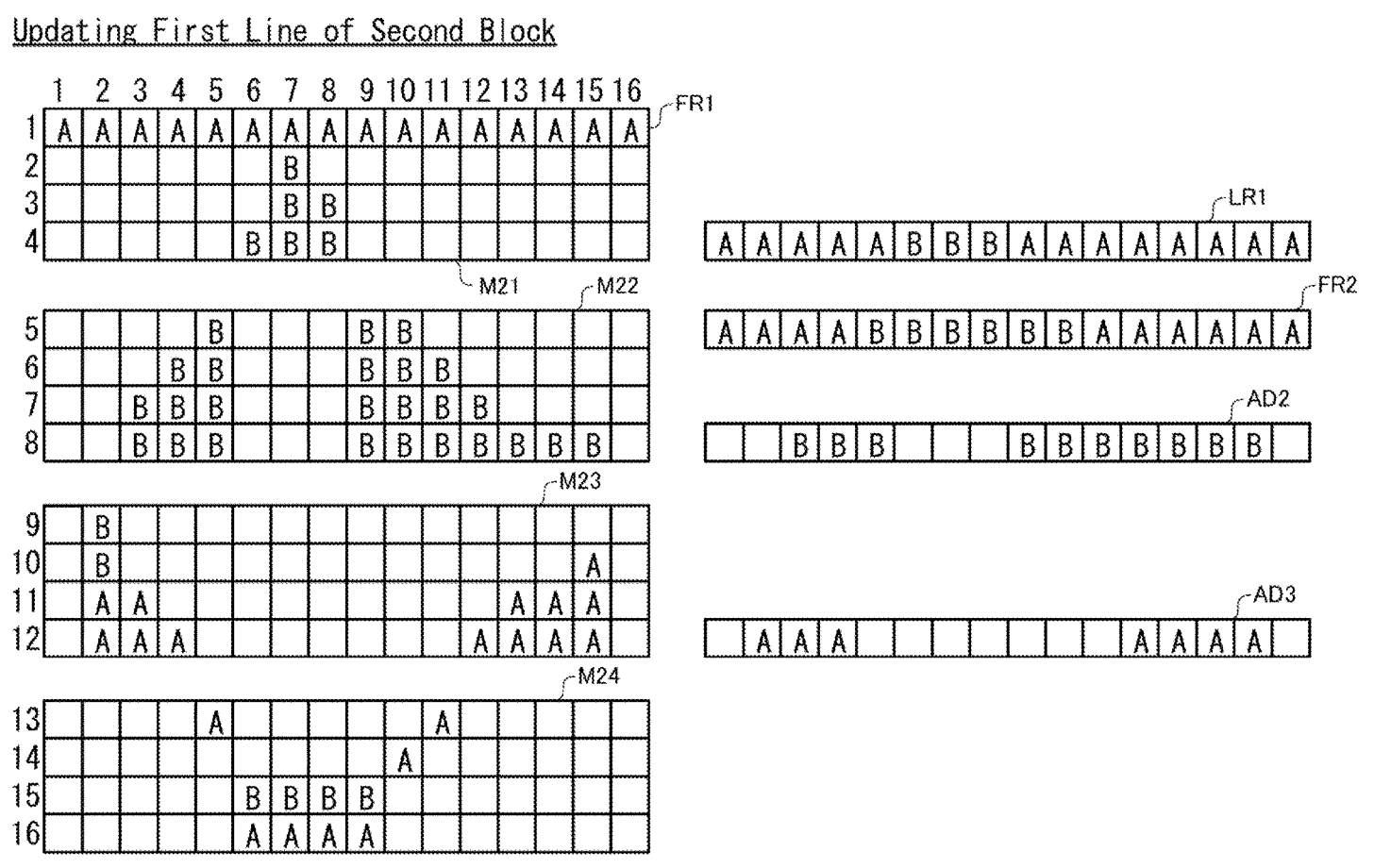

FIG. 8 illustrates a schematic drawing representing an updating process of the first row FR2 of the second row block according to Embodiment 1. At Step S770, one of the delta row decoding units 121 copies the first row FR1 in the first row block and then updates with the 4th accumulated delta AD1 to obtain the last row LR1. Subsequently, the delta row decoding unit 121 updates the last row LR1 using the delta of the first row in the second row block to obtain the first row FR2 in the second row block.

Figure 9:
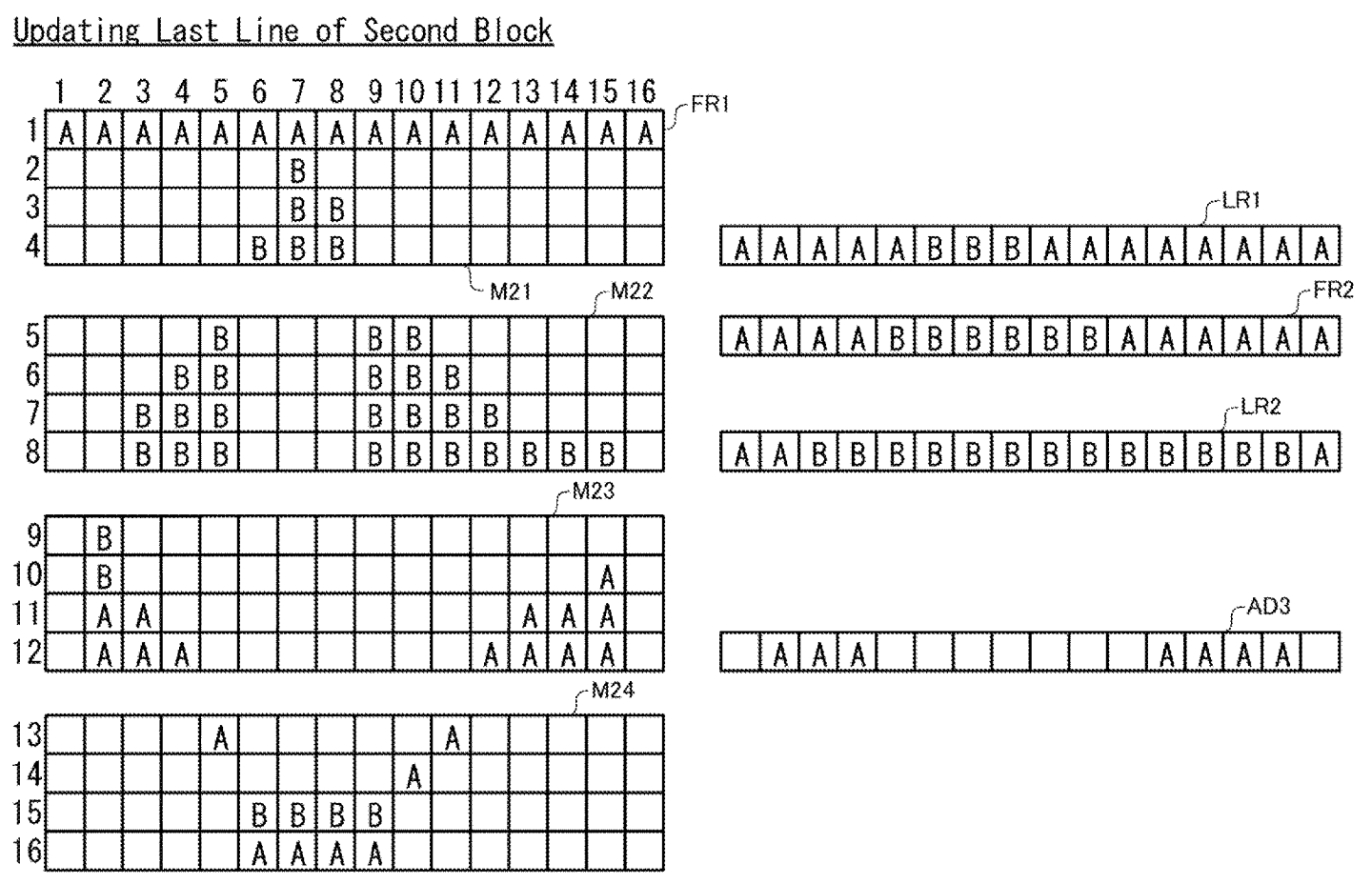

FIG. 9 illustrates a schematic drawing representing an updating process of the last row of the second row block according to Embodiment 1. The delta row decoding unit 121 copies the first row FR2 in the second row block and then updates with the 8th accumulated delta AD2 to obtain the last row LR2. Subsequently, the delta row decoding unit 121 updates the last row LR2 using the delta of the first row in the third row block to obtain the first row FR3 (see FIG. 10) in the third row block.

Figure 10:
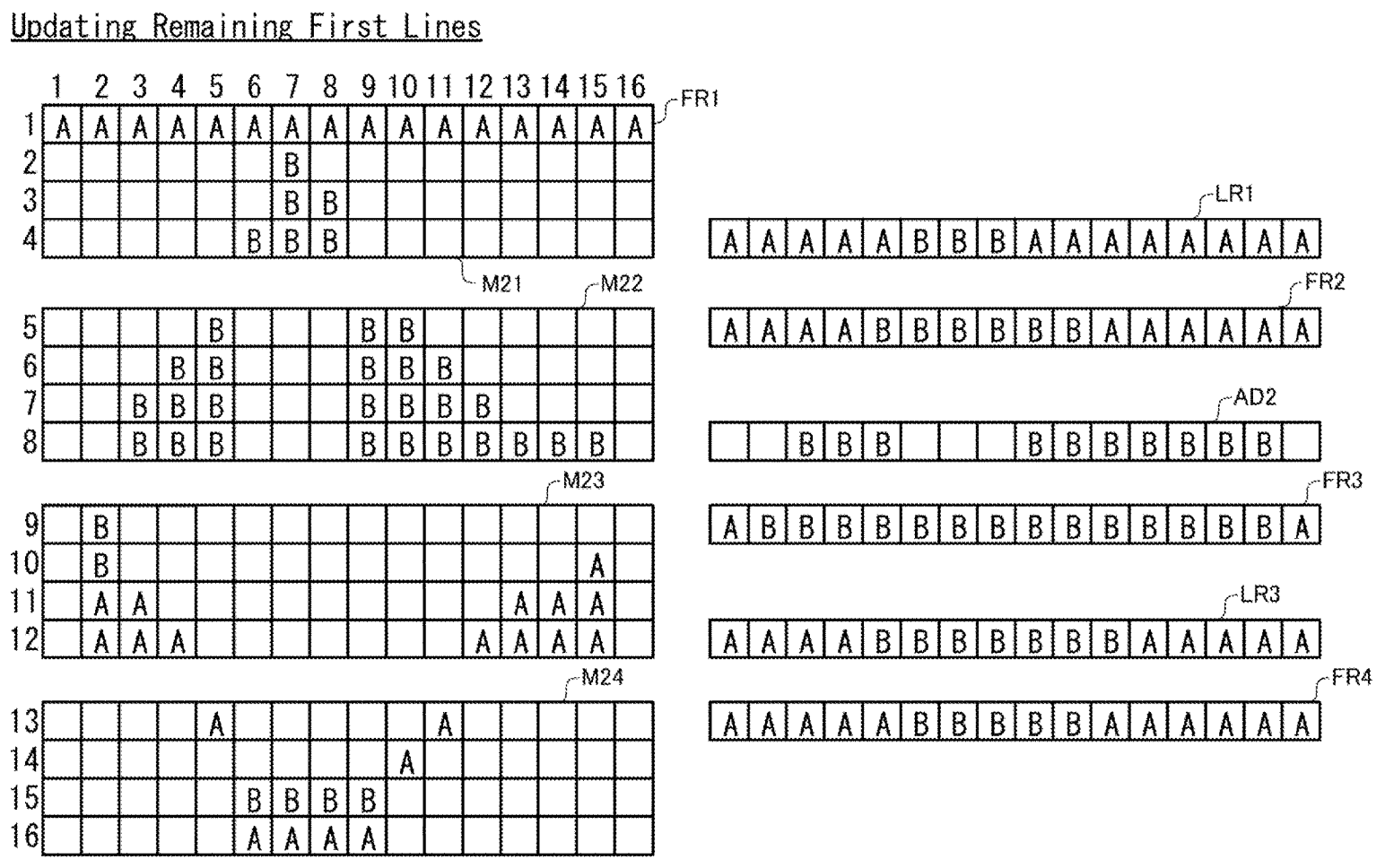

FIG. 10 illustrates a schematic drawing representing an updating process of the remaining first row according to Embodiment 1. Similarly, the delta row decoding unit 121 copies the first row FR3 in the third row block and then updates with the 12th accumulated delta AD3 (see FIG. 9) to obtain the last row LR3. Subsequently, the delta row decoding unit 121 updates the last row LR3 using the delta of the first row in the fourth row block to obtain the first row FR4 in the fourth row block.

Accordingly, the delta row decoding units 121 ensure the parallel decoding of the four row blocks with the respective first rows. For example, the first delta row decoding unit 121 performs the delta row processing of the first row block with the known first row FR1, the second delta row decoding unit 121 performs the delta row processing of the second row block with the obtained first row FR2, the third delta row decoding unit 121 performs the delta row processing of the third row block with the obtained first row FR3, and the fourth delta row decoding unit 121 performs the delta row processing of the fourth row block with the obtained first row FR4.

Figure 11:
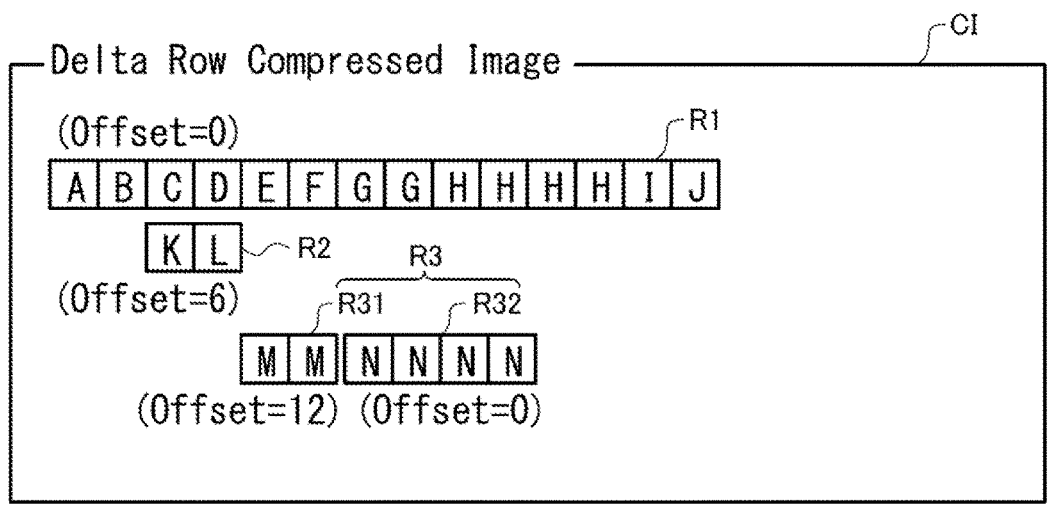
FIG. 11 illustrates a schematic drawing representing another typical delta row decoded result according to Embodiment 1.
Figure 11:
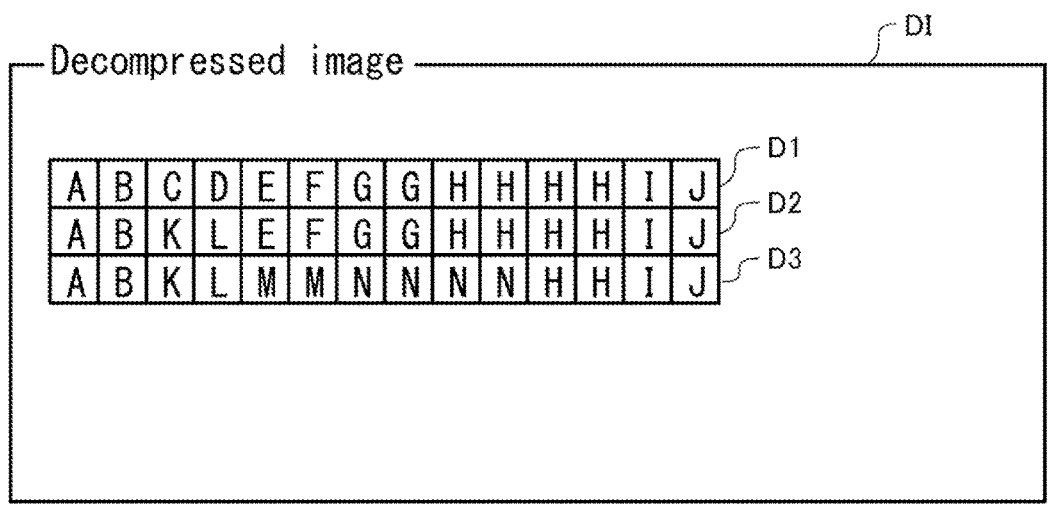

FIG. 11 illustrates a schematic drawing representing another typical delta row decoded result according to Embodiment 1. FIG. 11 illustrates delta row encoded image data CI and decoded image data DI for easy understanding of a decoding process and a rendering process in each of the row blocks in the disclosure. The delta row encoded image data CI is image data encoded from a plurality of pieces of original row data using the delta row encoding in the personal computer 200. The decoded image data DI is image data decoded from the delta row encoded image data CI using the inverse delta row encoding in the image forming device 100.

The delta row encoded image data CI includes the first encoded row data R1, the second encoded row data R2 as a delta, and the third encoded row data R3 as deltas. The decoded image data DI includes the first decoded row data D1, the second decoded row data D2, and the third decoded row data D3. The alphabets in pixels mean the respective colors of the pixels. The same alphabets indicate the same colors. The pixels in the first to fourth columns respectively include the alphabets of "A," "B," "C," and "D."

The first encoded row data R1 has an offset number of zero. The first decoded row data D1 is generated by simply copying the first encoded row data R1. The second encoded row data R2 includes a delta between the first original row data and the second original row data. The second encoded row data R2 includes a part of image with an offset number of 6, which is calculated by 2 pixels times 3 colors for RGB. The part of image has alphabets of "K" and "L" in the third column and the fourth column, respectively.

The offset number of 6 means that there is no difference between the first original row data and the second original row data in the first and second columns of "A" and "B." The offset number of six means that there is difference between the first original row data and the second original row data starting from the third column.

In the third column, the first original row data has an alphabet of "C" while the second original row data has an alphabet of "K." In the fourth column, the first original row data has an alphabet of "D" while the second original row data has an alphabet of "L." Thus, the third original row data is encoded into the second encoded row data R2 having only the two columns (two pixels) of data. This encoding saves data for the rest of the columns (pixels), which include the first pixel, the second pixel, and the fifth to fourteenth pixels.

The delta row decoding unit 121 decodes the second encoded row data R2 as follows. The delta row decoding unit 121 copies the first decoded row data D1 and then updates the third and fourth pixels from "C" and "D" to "K" and "L." This decoding process generates the second decoded row data D2.

The third encoded row data R3 includes the first part of image R31 and the second part of image R32. The first part of image R31 has the first offset number of 12, which is calculated by 4 pixels times 3 colors for RGB, and has an alphabet of "M" in the fifth and sixth columns. The second part of image R32 has the second offset number of 0, which is calculated by 0 pixels times 3 colors for RGB from the first part of image R31, and has an alphabet of "N" in the seventh to tenth columns.

The first offset number of 12 means that there is no difference between the second original row data and the third original row data in the first to fourth columns of "A," "B," "K," and "L." The part of image R31 has the alphabet of "M" in the fifth and sixth columns. The second offset number of 0 means that there is difference between the first original row data and the second original row data starting from the next or the seventh column. The second part of image R32 has the alphabet of "N" in the seventh to tenth columns.

The delta row decoding unit 121 decodes the third encoded row data R3 as follows. The delta row decoding unit 121 copies the second decoded row data D2 and then respectively updates the fifth and sixth columns from "E" and "F" to "M" and "M." The delta row decoding unit 121 further updates the seventh to tenth columns from "G," "G," "H," and "H" to "N," "N," "N," and "N," respectively.

Figure 12:
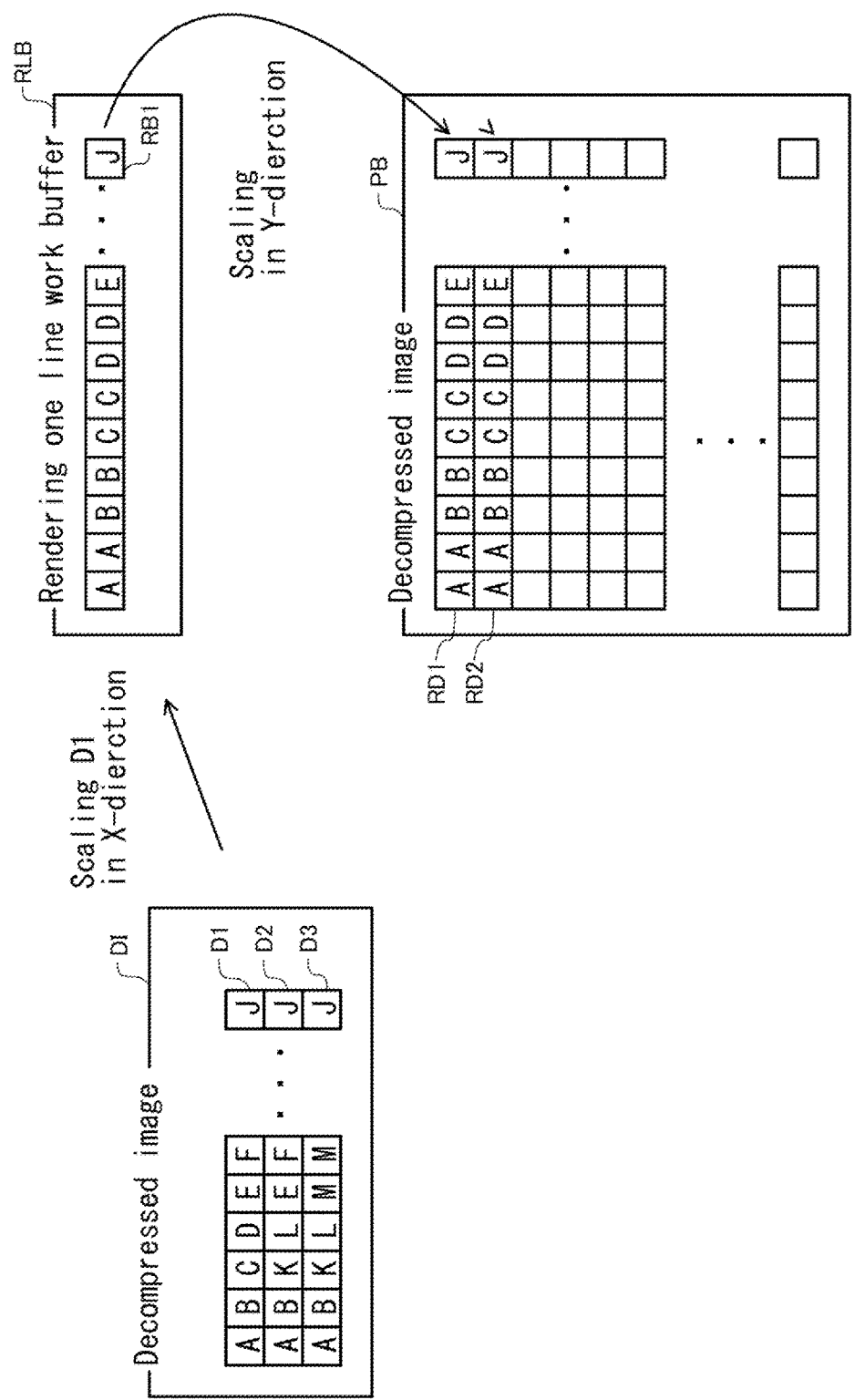
FIG. 12 illustrates a schematic drawing representing a typical image rendering process according to Embodiment 1.

FIG. 12 illustrates a schematic drawing representing a typical image rendering process according to Embodiment 1. At Step S790, the four image rendering units 122 perform a parallel processing of rendering the decoded image data DI to generate bit map data RD of the image by pixel replication in the respective first to fourth row blocks. The scaling factor is 2 in X-direction (row direction) and Y-direction (column direction).

The image rendering unit 122 replicate the pixels in the first decoded row data D1 in X-direction using a rendering one line work buffer RLB, thus generating the rendered line data RB1. The image rendering unit 122 replicates the pixels in the rendered line data RB1 in Y-direction, thus generating the rendered rows data RD1 and RD2 in a page buffer PB.

Figure 13:
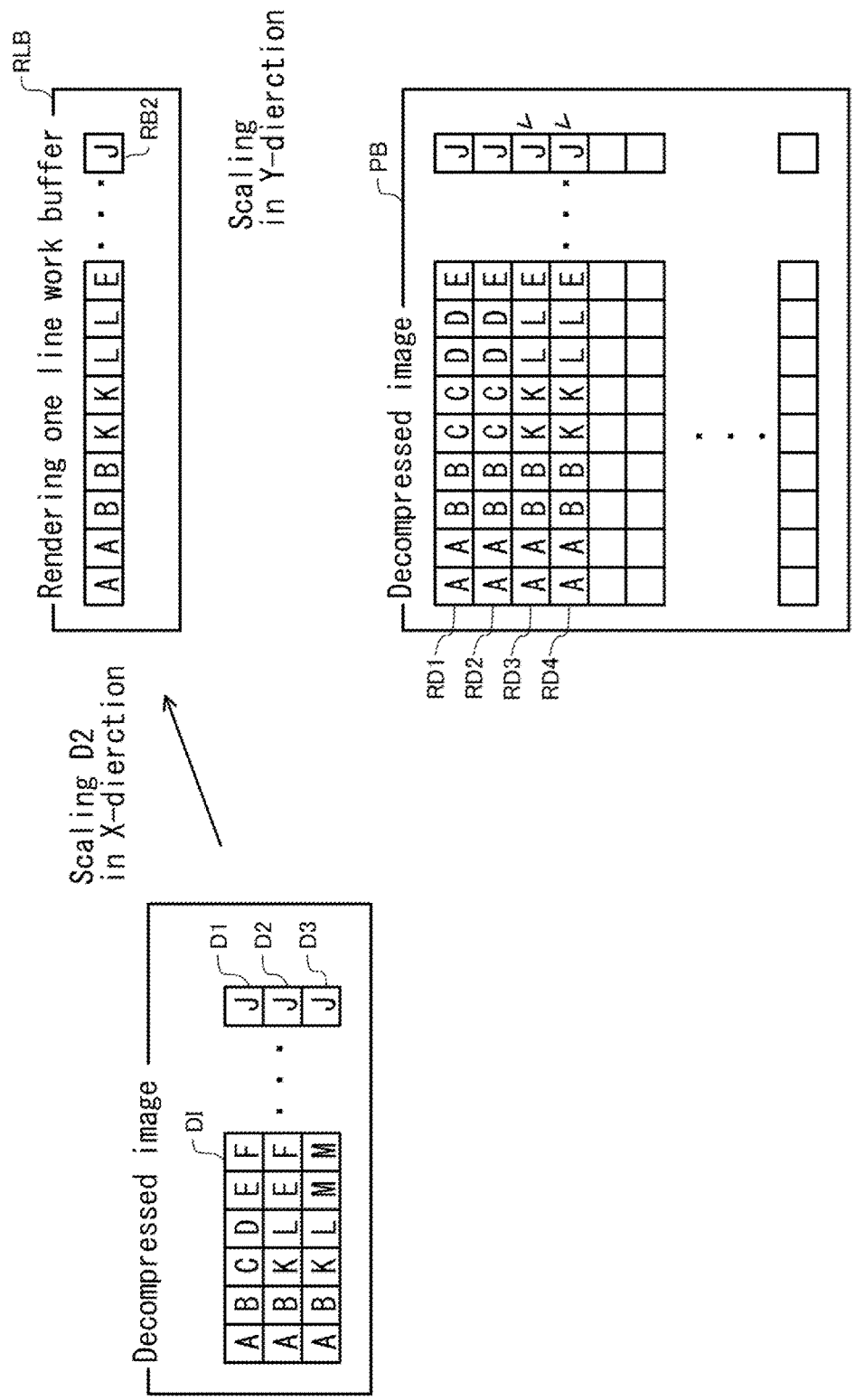
FIG. 13 illustrates a schematic drawing representing the typical image rendering process according to Embodiment 1.

FIG. 13 illustrates a schematic drawing representing the typical image rendering process according to Embodiment 1. The image rendering unit 122 replicate the pixels in the first decoded row data D2 in X-direction using one line buffer RLB, thus generating the rendered line data RB2. The image rendering unit 122 replicates the pixels in the rendered line data RB2 in Y-direction, thus generating the rendered rows data RD3 and RD4 in the page buffer PB.

As described above, the image forming device 100 according to Embodiment 2 ensures the parallel decoding of delta row encoded data for obtaining the plurality of blocks of decoded data, and also ensures the parallel rendering of the plurality of blocks of decoded data. This parallel processing takes advantage of the central processing units (CPUs) having a plurality of independent actual processing units (which are called "cores") widely employed for the image-forming apparatuses.

Figure 14:
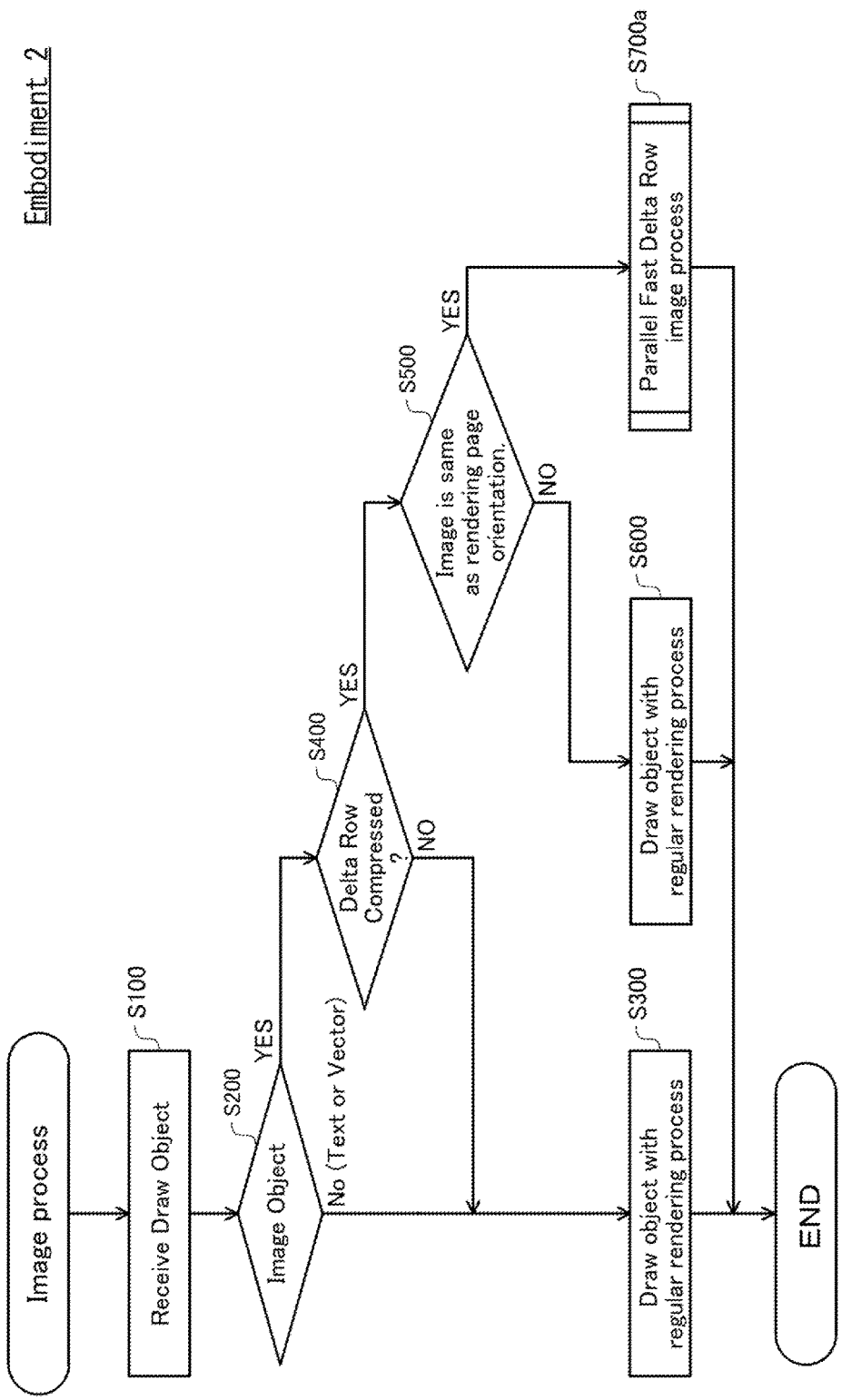
FIG. 14 illustrates a flow chart representing an image process according to Embodiment 2.

FIG. 14 illustrates a flow chart representing an image process according to Embodiment 2. The image process according to Embodiment 2 is different from the image process according to Embodiment 1 in that Step S700 is replaced with Step S700a.

Figure 15:
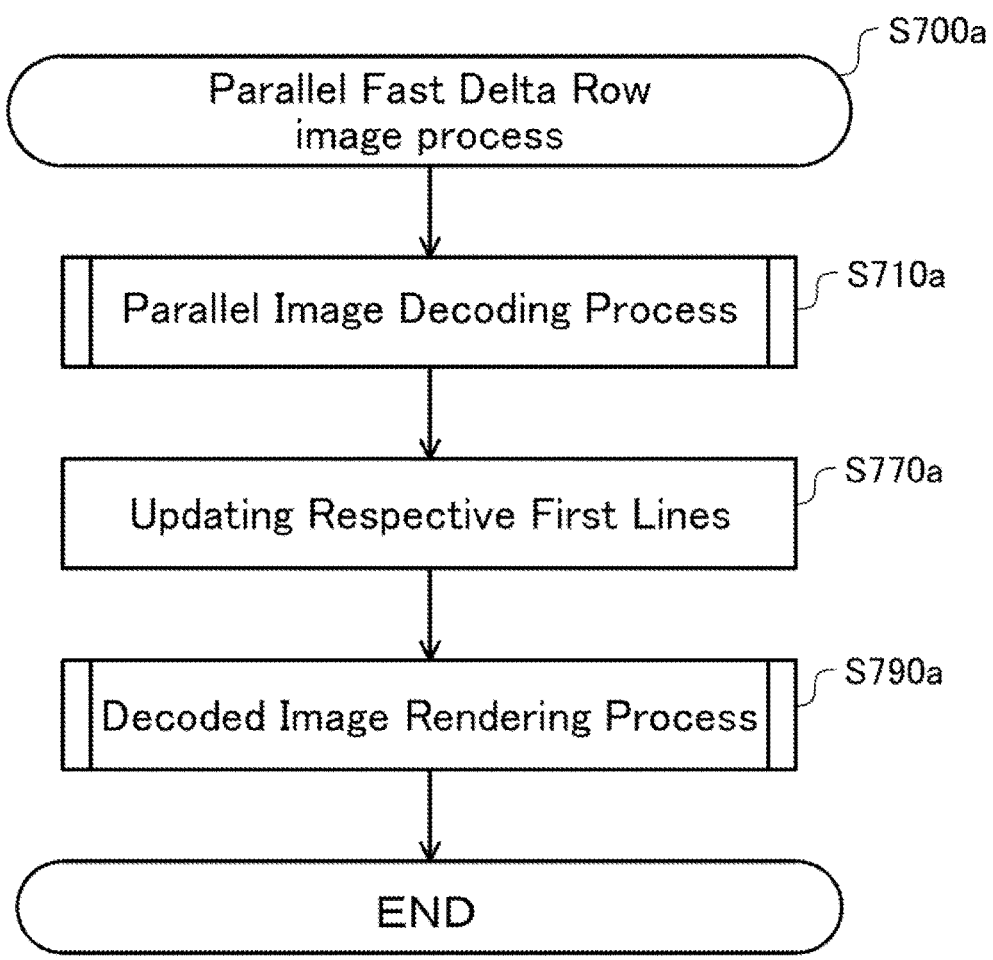
FIG. 15 illustrates a flow chart representing a parallel fast delta row image process according to Embodiment 2.

FIG. 15 illustrates a flow chart representing a parallel fast delta row image process according to Embodiment 2. At Step S700a, the delta row decoding units 121 performs the parallel fast delta row image process (also referred to as PFDR image process). The PFDR image process includes a step of parallel decoding images, a step of updating, and a step of rendering the decoded images. The PFDR image process includes a parallel processing of fast delta row image processes for respective row blocks (also referred to as FDR image process).

Figure 16:
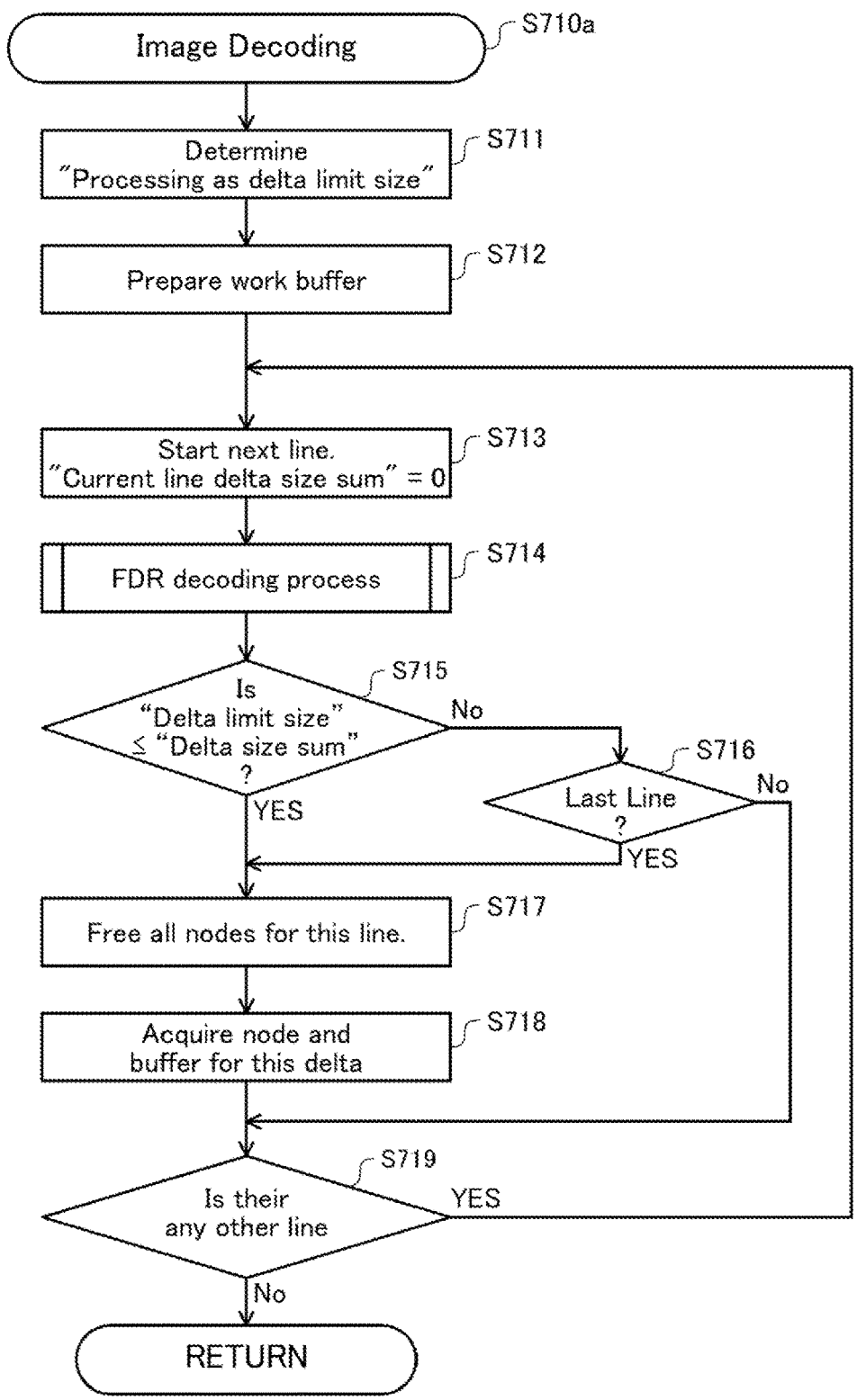
FIG. 16 illustrates a flow chart representing a parallel image decoding process of the fast delta row image process according to Embodiment 2.

FIG. 16 illustrates a flow chart representing a parallel image decoding process of the fast delta row image process according to Embodiment 2. The parallel image decoding processes are performed in the divided row blocks similarly to Embodiment 1. At Step S711, the delta row decoding unit 121 determines "Processing as delta limit size," which is also simply referred to as "Delta limit size."

The delta row decoding unit 121 reads out a predetermined "ratio for processing as delta limit" of 0.25 from the storage unit 140. The delta row decoding unit 121 multiplies "Input image one line buffer size" by the ratio for processing as delta limit of 0.25. The input image one line buffer size is 42, which is calculated by multiplying the number of pixels of 14 or image width in one line by 3 colors of RGB. Thus, the calculated delta limit size is 10.5.

Figure 17:
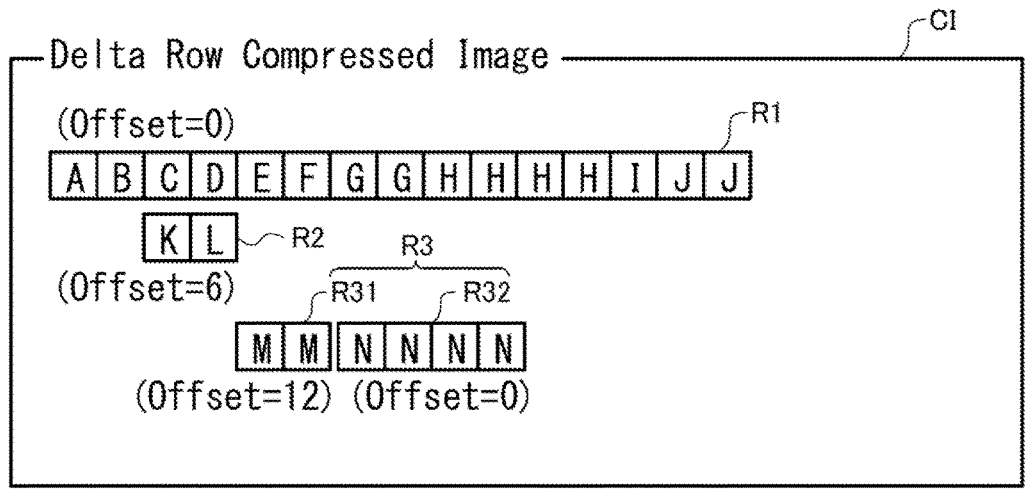
FIG. 17 illustrates a schematic drawing representing an FDR decoding according to Embodiment 2.
Figure 17:
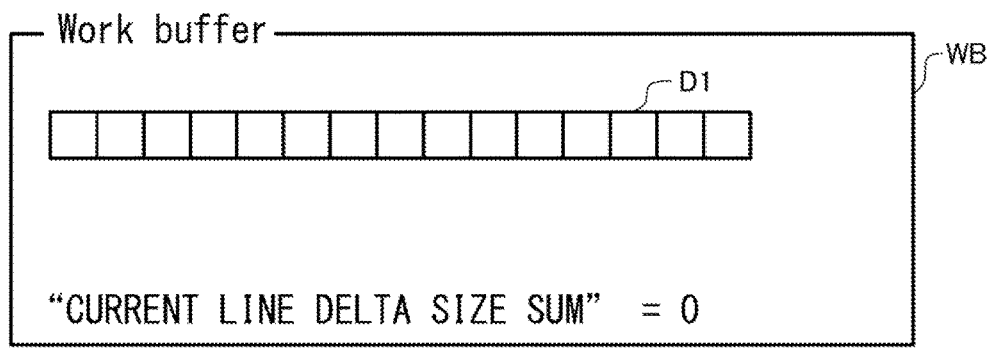
Figure 17:
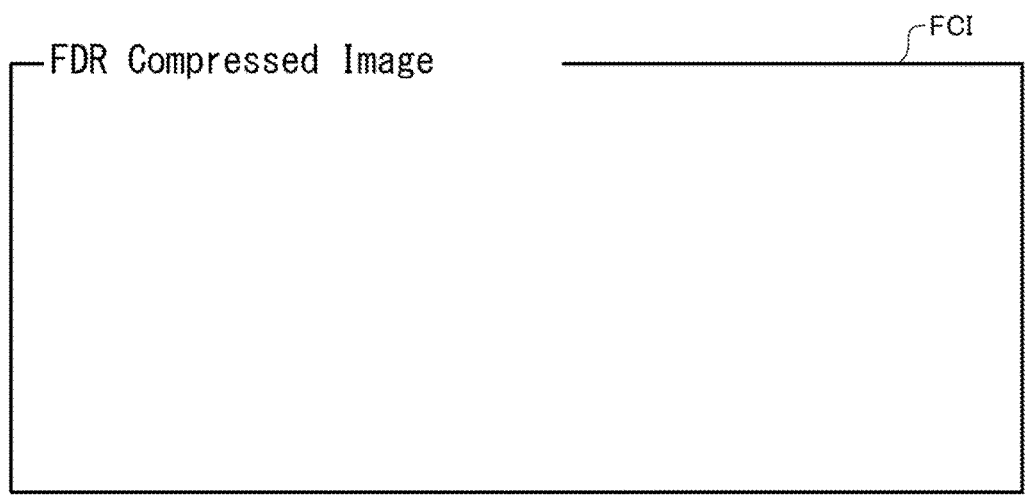

FIG. 17 illustrates a schematic drawing representing an FDR decoding according to Embodiment 2. At Step S712, the delta row decoding unit 121 prepares the work buffer WB. The work buffer WB has the same size as the input image one line buffer size. At Step S713, the delta row decoding unit 121 initializes the current line delta size sum to 0, which is also simply referred to as "Delta size sum." At Step S714, the delta row decoding unit 121 performs the FDR decoding process.

Figure 18:
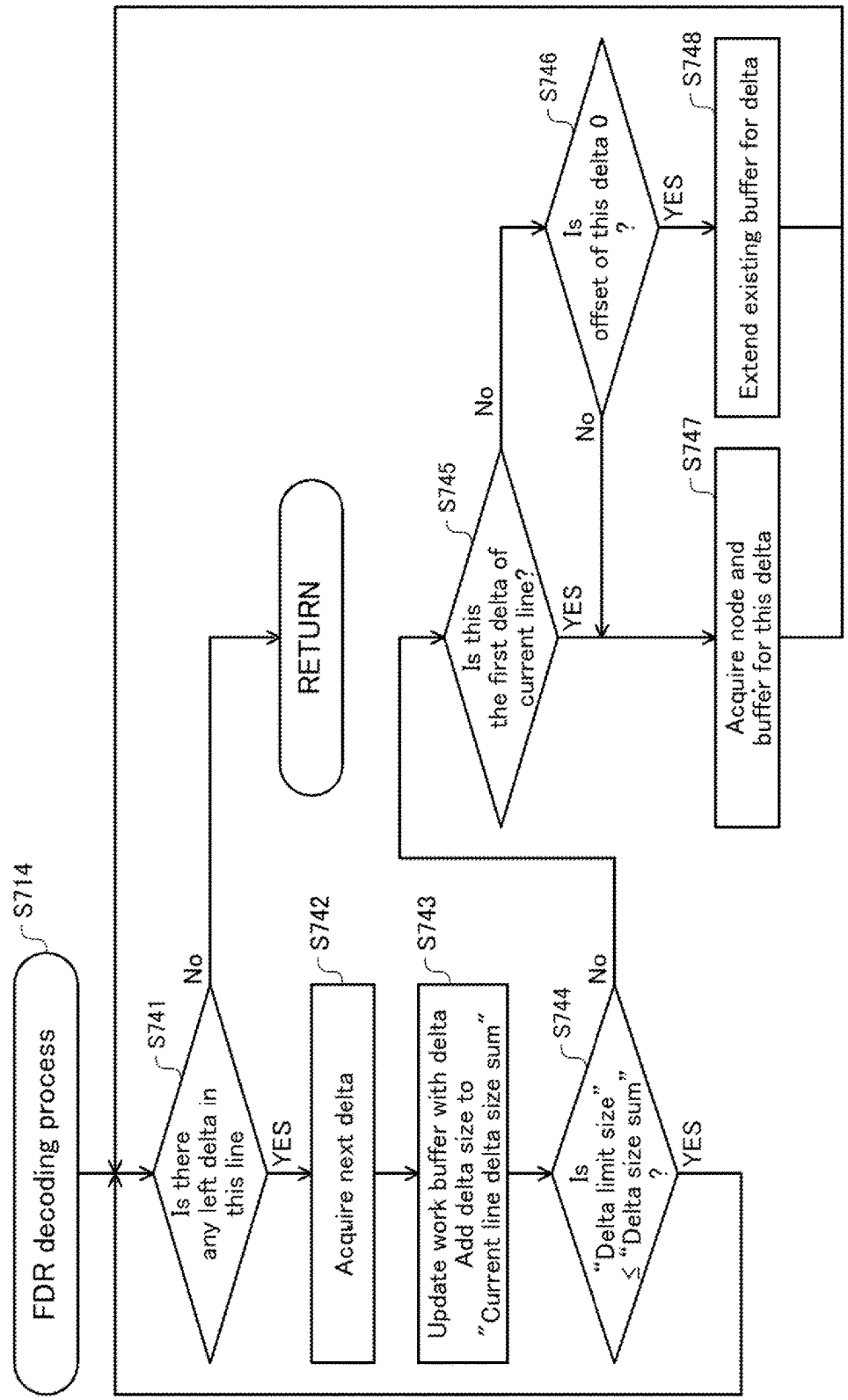
FIG. 18 illustrates a flow chart representing a Fast delta row image decoding process according to Embodiment 2.

FIG. 18 illustrates a flow chart representing a fast delta row image decoding process according to Embodiment 2. At Step S741, the delta row decoding unit 121 determines whether there is any delta left in this line or not. If there is any delta left in this line, the delta row decoding unit 121 advances the process to Step S742. If there is no left delta in this line, the delta row decoding unit 121 advances the process to Step S715 (see FIG. 16).

In this case, there is a delta of the first encoded row data R1. Thus, the delta row decoding unit 121 advances the process to Step S742. At Step S742, the delta row decoding unit 121 acquires the delta of the first encoded row data R1, the entire of which is the delta because there is no prior encoded row data.

Figure 19:
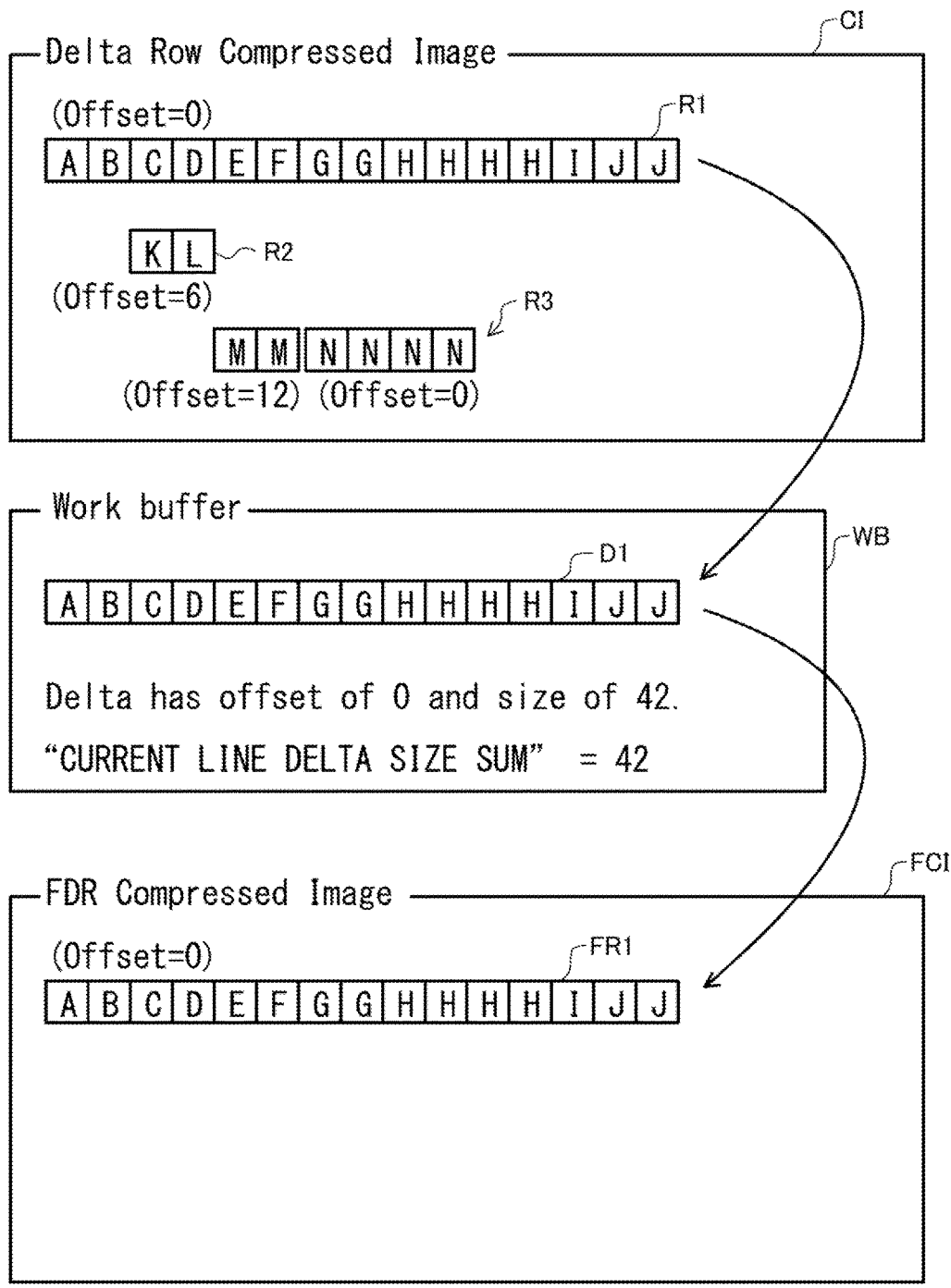
FIG. 19 illustrates a schematic drawing representing an FDR decoding according to Embodiment 2.

FIG. 19 illustrates a schematic drawing representing the FDR decoding according to Embodiment 2. At Step S743, the delta row decoding unit 121 updates the work buffer WB with the delta of the first encoded row data R1 and adds the delta size of 42, which is one line buffer size, to the current line delta size sum. The delta size of 42 is calculated by multiplying the number of pixels of 14 or image width in one line by 3 colors of RGB because the entire line is updated.

At Step S744, the delta row decoding unit 121 determines whether the delta size sum is equal to or larger than the delta limit size or not. If the delta size sum is equal to or larger than the delta limit size, the delta row decoding unit 121 returns the process to Step S741. If the delta size sum is smaller than the delta limit size, the delta row decoding unit 121 advances the process to Step S745. In this case, the delta size sum is 42 while the delta limit size is 10.5 (which means YES). Thus, the delta row decoding unit 121 returns the process to Step S741.

At Step S741, the delta row decoding unit 121 determines whether there is any delta left in this line or not. If there is any delta left in this line, the delta row decoding unit 121 advances the process to Step S742. If there is no left delta in this line, the delta row decoding unit 121 advances the process to Step S715 (see FIG. 16). In this case, there is no left delta in the first encoded row data R1. Thus, the delta row decoding unit 121 advances the process to Step S715 (see FIG. 16).

At Step S715, the delta row decoding unit 121 determines whether the delta size sum is equal to or larger than the delta limit size or not. In this case, the delta size sum is 42 while the delta limit size is 10.5 (which means YES). Thus, the delta row decoding unit 121 advances the process to Step S717.

At Step S717, the delta row decoding unit 121 frees all the nodes for this line. At Step S718, the delta row decoding unit 121 acquires a node and a line buffer for this delta of the first encoded row data R1. The line buffer has the same size as the input image one line buffer size. The delta row decoding unit 121 copies the work buffer WB to this line buffer, which constitutes a part of the FDR compressed image FCI as FDR encoded row data FR1.

At Step S719, the delta row decoding unit 121 determines whether there is any other line or not. If there is any other line, the delta row decoding unit 121 returns the process to Step S713. If there is no line left, the delta row decoding unit 121 advances the process to Step S770a (see FIG. 15). In this case, there are other lines left. Thus, the delta row decoding unit 121 returns the process to Step S713.

At Step S713, the delta row decoding unit 121 initializes the current line delta size sum to 0. At Step S741, the delta row decoding unit 121 determines whether there is any delta left in this line. In this case, there is a delta as the second encoded row data R2. Thus, the delta row decoding unit 121 advances the process to Step S742. At Step S742, the delta row decoding unit 121 acquires the delta of the second encoded row data R2.

Figure 20:
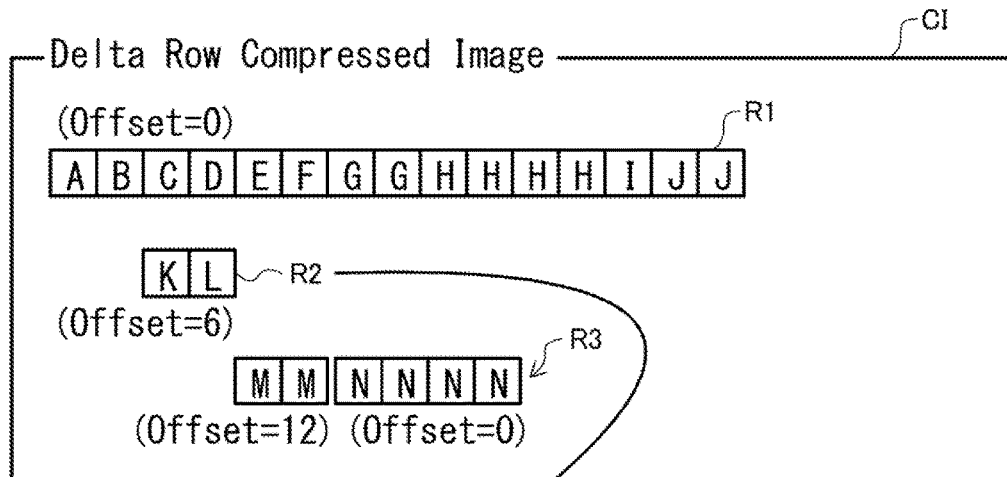
FIG. 20 illustrates a schematic drawing representing the FDR decoding according to Embodiment 2.
Figure 20:
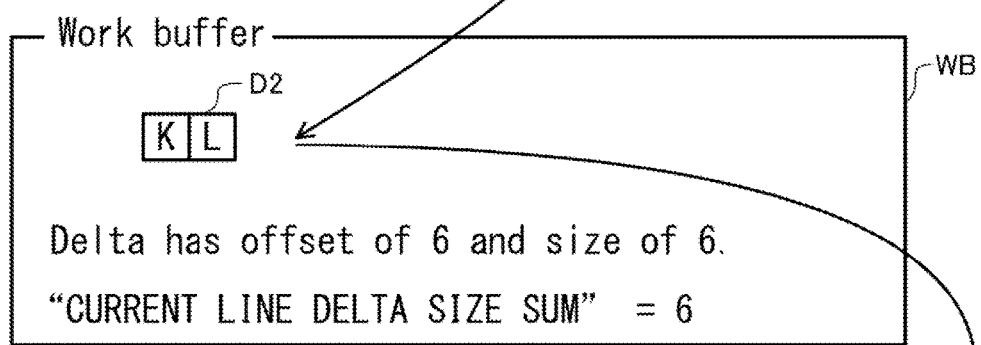
Figure 20:
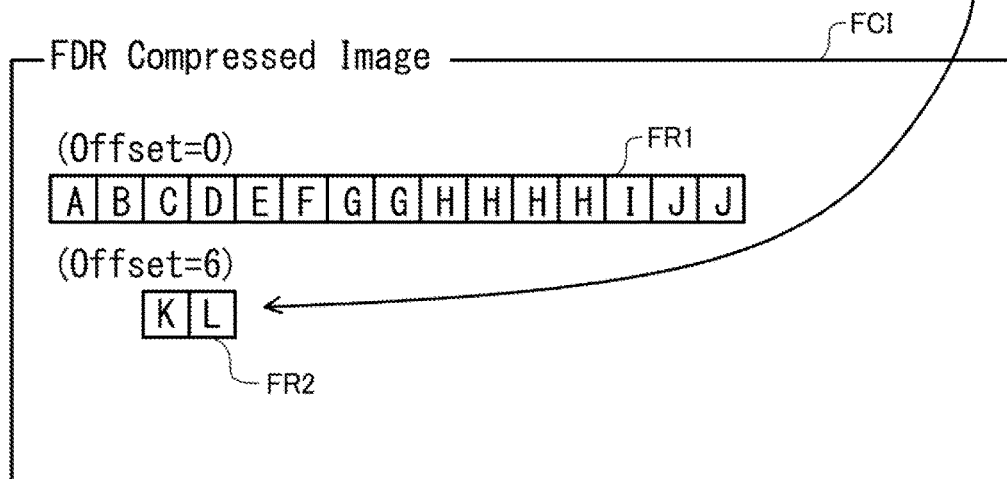

FIG. 20 illustrates a schematic drawing representing the FDR decoding according to Embodiment 2. At Step S743, the delta row decoding unit 121 updates the work buffer WB with the delta of the second encoded row data R2 and adds the delta size of 6, which is calculated by 2 pixels times 3 colors for RGB, to the delta sum.

At Step S744, the delta row decoding unit 121 determines whether the delta size sum is equal to or larger than the delta limit size or not. In this case, since the delta size sum of 6 is smaller than the delta limit size, the delta row decoding unit 121 advances the process to Step S745.

At Step S745, the delta row decoding unit 121 determines whether this is the first delta of current line or not. If this is the first delta of current line, the delta row decoding unit 121 advances the process to Step S747. If this is not the first delta of current line, the delta row decoding unit 121 advances the process to Step S746. At Step S746, the delta row decoding unit 121 extends the buffer for this the delta in the FDR compressed image FCI if the offset of this delta is 0 at Step S748. In this case, since this is the first delta of current line, the delta row decoding unit 121 advances the process to Step S747.

At Step S747, the delta row decoding unit 121 acquires a node and allocates a line buffer for the delta of the second encoded row data R2. The node has the offset number of 6. The line buffer has the same size as the delta size of 6. The delta row decoding unit 121 copies the work buffer WB to this line buffer, which constitutes a part of the FDR compressed image FCI as FDR encoded row data FR2.

The delta row decoding unit 121 returns the process to Step S741. In this case, there is no left delta in the second encoded row data R2. Thus, the delta row decoding unit 121 advances the process to Step S715.

At Step S715, the delta row decoding unit 121 determines whether the delta size sum is equal to or larger than the delta limit size or not. In this case, the delta size sum is 6 while the delta limit size is 10.5 (which means NO). Thus, the delta row decoding unit 121 advances the process to Step S716.

At Step S716, the delta row decoding unit 121 determines whether the row is the last row in the row block or not. If the row is the last row in the row block, the delta row decoding unit 121 advances the process to Step S717. If the row is not the last row in the block, the delta row decoding unit 121 advances the process to Step S719. This process ensures obtaining the last row in every row block.

At Step S719, the delta row decoding unit 121 determines whether there is any other line or not. In this case, there is another line of the third encoded row data R3. Thus, the delta row decoding unit 121 returns the process to Step S713.

At Step S713, the delta row decoding unit 121 initializes the current line delta size sum to 0. At Step S741, the delta row decoding unit 121 determines whether there is any delta left in this line or not. In this case, there are two deltas in the third encoded row data R3. Thus, the delta row decoding unit 121 advances the process to Step S742. At Step S742, the delta row decoding unit 121 acquires the first delta R31 in the third encoded row data R3.

Figure 21:
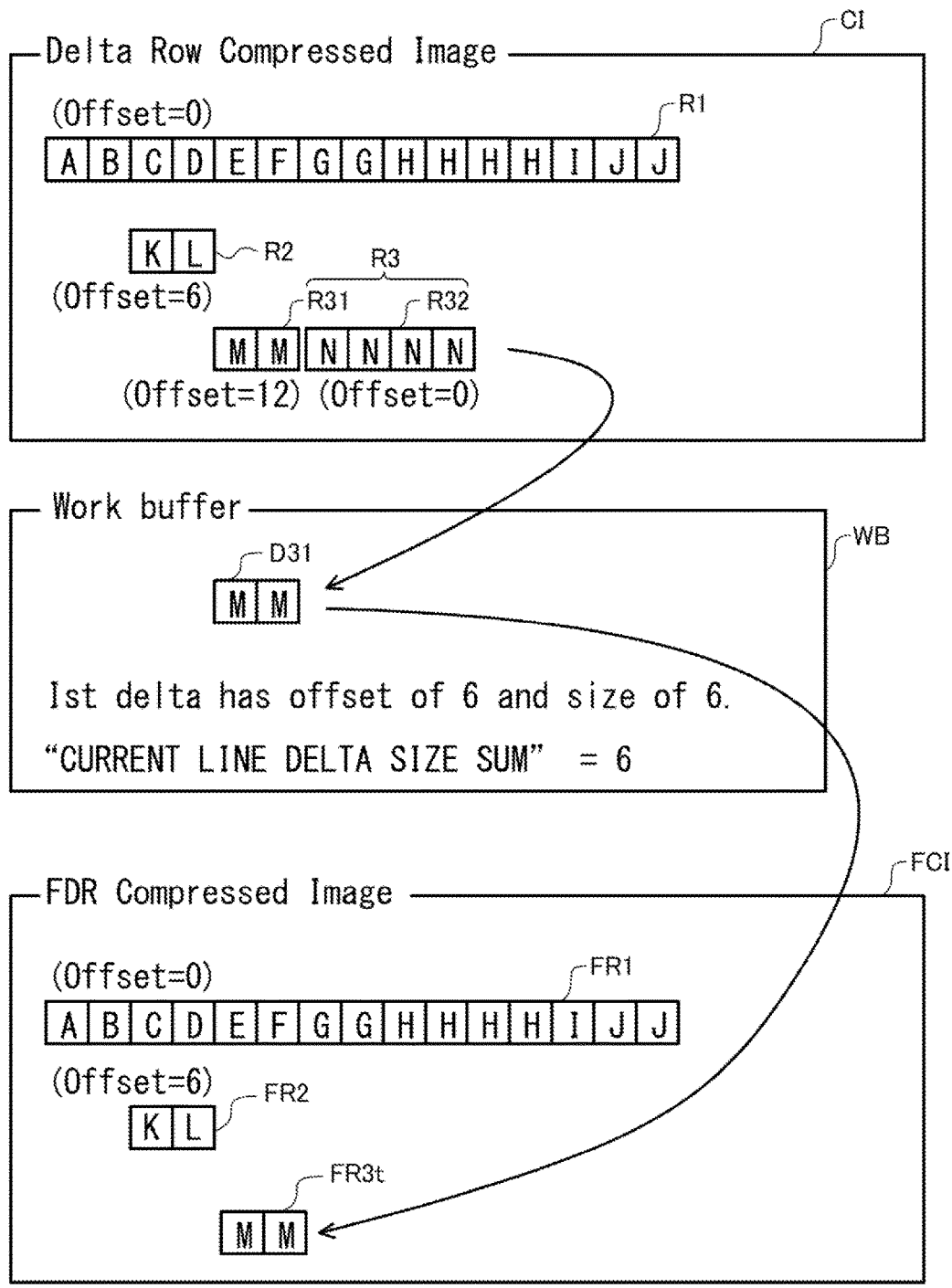
FIG. 21 illustrates a schematic drawing representing the FDR decoding according to Embodiment 2.

FIG. 21 illustrates a schematic drawing representing the FDR decoding according to Embodiment 2. At Step S743, the delta row decoding unit 121 updates the work buffer WB with the first delta R31 in the third encoded row data R3 and adds the delta size of 6, which is calculated by 2 pixels times 3 colors for RGB, to the delta size sum.

At Step S744, the delta row decoding unit 121 determines whether the delta size sum is equal to or larger than the delta limit size or not. In this case, the delta size sum of 6 is smaller than the delta limit size, the delta row decoding unit 121 advances the process to Step S745.

At Step S745, the delta row decoding unit 121 determines whether this is the first delta of current line or not. In this case, this is the first delta of current line. Thus, the delta row decoding unit 121 advances the process to Step S747.

At Step S747, the delta row decoding unit 121 acquires a node and allocates a line buffer for the first delta R31 in the third encoded row data R3. The node has the first offset number of 12. The line buffer has the same size as the delta size of 6. The delta row decoding unit 121 copies the work buffer WB to this line buffer, which constitutes a part of the FDR compressed image FCI as FDR encoded row data FR3t, which is tentative due to the following second delta R32.

The delta row decoding unit 121 returns the process to Step S741. In this case, there is the second delta R32 left in the third encoded row data R3. Thus, the delta row decoding unit 121 advances the process to Step S742. At Step S742, the delta row decoding unit 121 acquires the second delta R32 in the third encoded row data R3.

Figure 22:
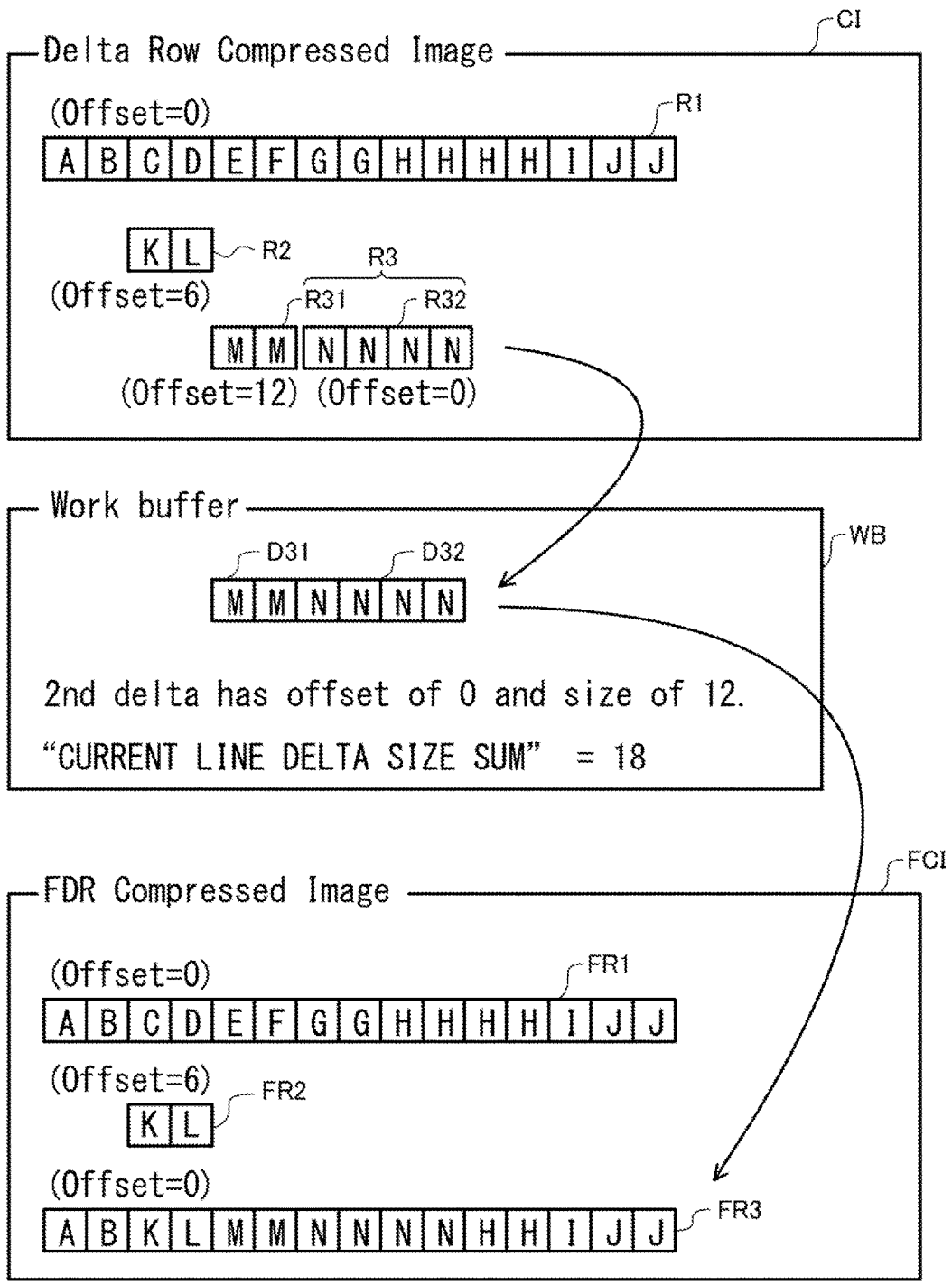
FIG. 22 illustrates a schematic drawing representing the FDR decoding according to Embodiment 2.

FIG. 22 illustrates a schematic drawing representing the FDR decoding according to Embodiment 2. At Step S743, the delta row decoding unit 121 updates the work buffer WB with the second delta R32 in the third encoded row data R3 and adds the delta size of 12, which is calculated by 4 pixels times 3 colors for RGB, to the delta size sum. This makes the delta size sum 18.

At Step S744, the delta row decoding unit 121 determines whether the delta size sum is equal to or larger than the delta limit size of 10.5 or not. In this case, the delta size sum is 18 while the delta limit size is 10.5 (which means YES). Thus, the delta row decoding unit 121 advances the process to Step S741.

At Step S744, if the delta size sum were smaller than the delta limit size (which means NO), the delta row decoding unit 121 would advance the process to Step S745. In this case, since this is not the first delta of current line, the delta row decoding unit 121 advances the process to Step S746. Since the offset of this delta is 0 at Step S746, the delta row decoding unit 121 extends the existing buffer and copies this delta to this extended portion of this line buffer. Then, the delta row decoding unit 121 advances the process to Step S741.

At Step S741, the delta row decoding unit 121 determines whether there is any delta left in this line or not. In this case, there is no left delta in the third encoded row data R3. Thus, the delta row decoding unit 121 advances the process to Step S715 (see FIG. 7).

At Step S715, the delta row decoding unit 121 determines whether the delta size sum is equal to or larger than the delta limit size or not. In this case, the delta size sum is 18 while the delta limit size is 10.5 (which means YES). Thus, the delta row decoding unit 121 advances the process to Step S717.

At Step S717, the delta row decoding unit 121 frees all the nodes for the work buffer WB. At Step S718, the delta row decoding unit 121 acquires a node and allocates a line buffer for the entire third encoded row data R3. The line buffer has the same size as the input image one line buffer size. The delta row decoding unit 121 copies the work buffer WB to this line buffer, which constitutes a part of the FDR compressed image FCI as FDR encoded row data FR3.

At Step S719, the delta row decoding unit 121 determines whether there is any other line or not. In this case, there is no line left. Thus, the delta row decoding unit 121 advances the process to Step S770a (see FIG. 15).

At Step S770a, the delta row decoding unit 121 copies the last rows in the respective row blocks generated through Step S716 and then update with deltas in the respective first rows one by one starting from the second row block.

Figure 23:
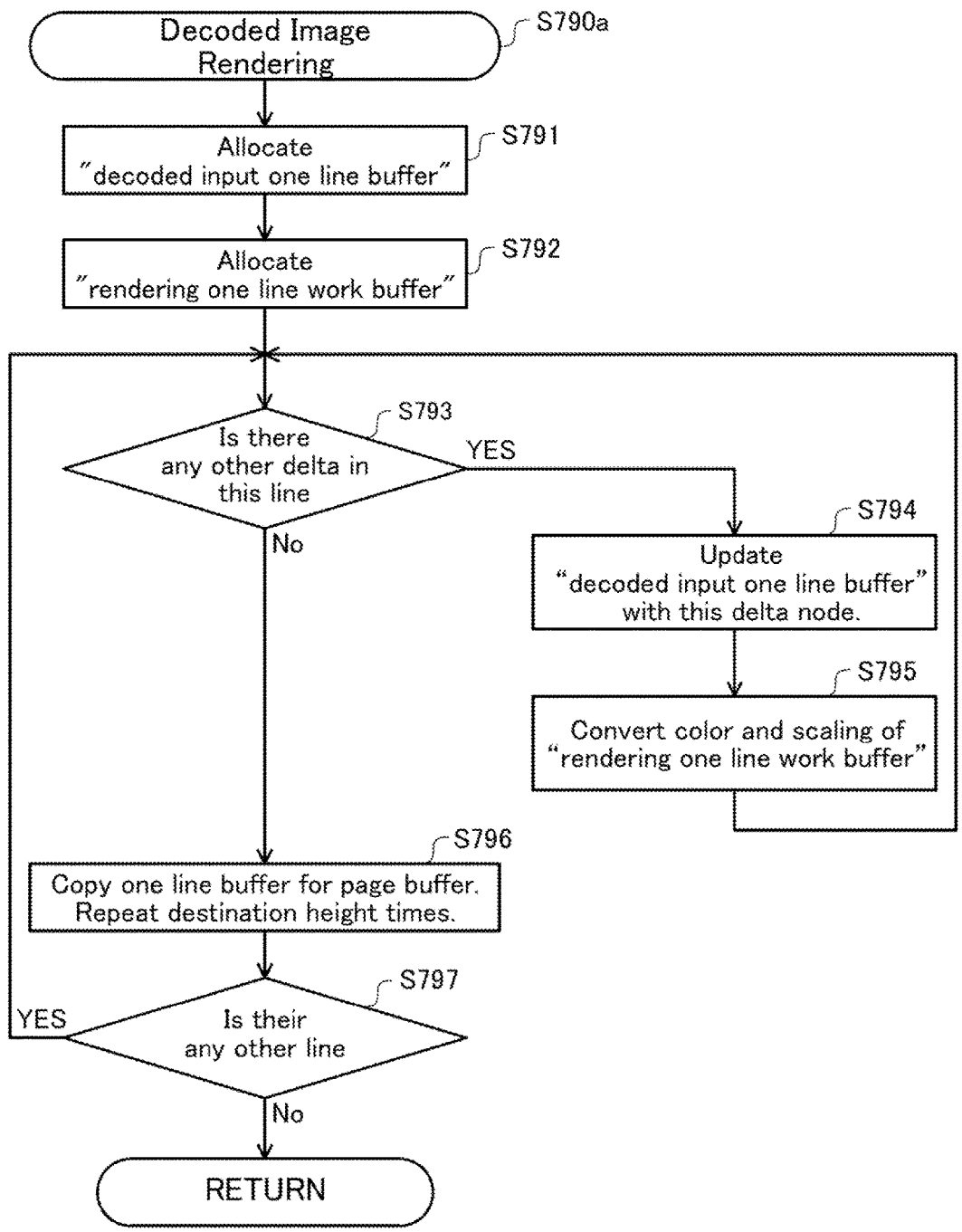
FIG. 23 illustrates a flow chart representing an image rendering process of decoded image according to Embodiment 2.
Figure 24:
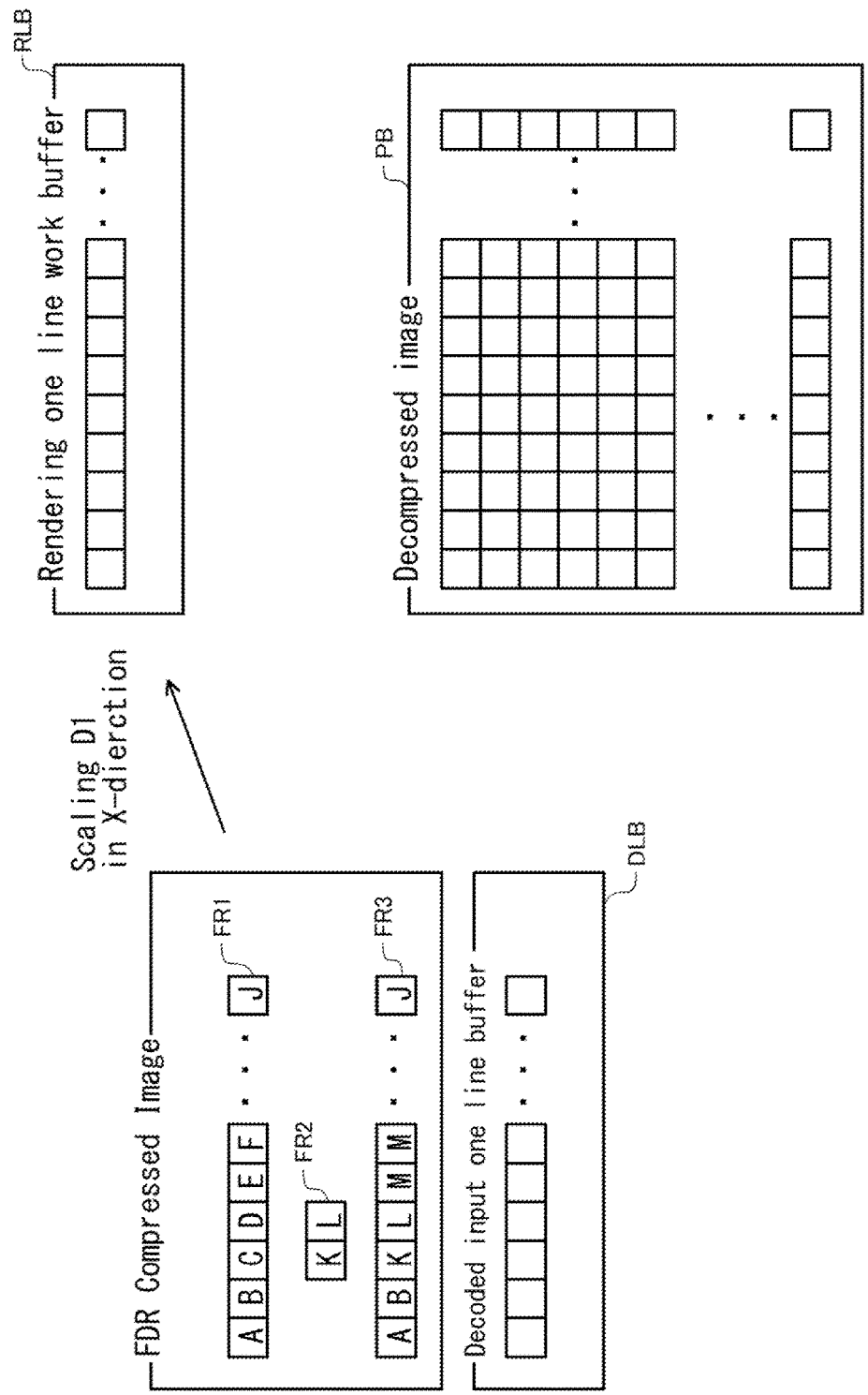
FIG. 24 illustrates a schematic drawing representing an image rendering process according to Embodiment 2.

FIG. 23 illustrates a flow chart representing an image rendering process (Step 790a) of decoded image according to Embodiment 2. FIG. 24 illustrates a schematic drawing representing an image rendering process according to Embodiment 2. At Step S791, the image rendering unit 122 allocates a decoded input one line buffer DLB. The decoded input one line buffer DLB has the same buffer size as the input image one line buffer size for the FDR encoded row data.

At Step S792, the image rendering unit 122 allocates a rendering one line work buffer RLB. The rendering one line work buffer RLB has a buffer size depending on a size of the original row data and the scaling factor in X-direction (row direction).

At Step S793, the delta row decoding unit 121 determines whether there is any delta left in this line. If there is any delta left in this line, the delta row decoding unit 121 advances the process to Step S794. If there is no left delta in this line, the delta row decoding unit 121 advances the process to Step S796. In this case, the delta row decoding unit 121 advances the process to Step S794.

Figure 25:
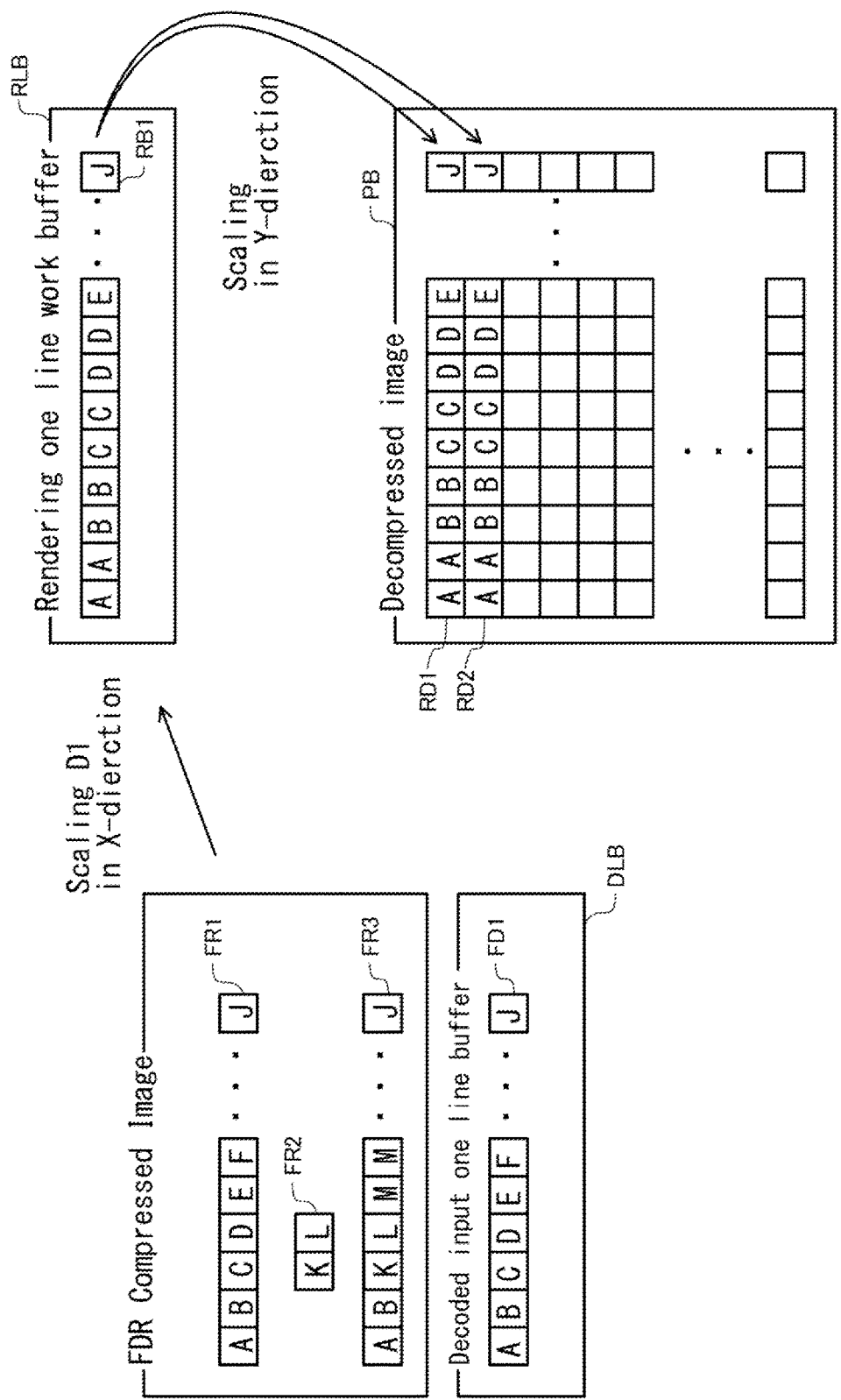
FIG. 25 illustrates a schematic drawing representing the image rendering process according to Embodiment 2.

FIG. 25 illustrates a schematic drawing representing the image rendering process according to Embodiment 2. The first FDR encoded row data FR1 has an offset number of zero. At Step S794, the first decoded input line data FD1 is generated by simply copying the first FDR encoded row data FR1, which is one kind of update.

At Step S795, the image processing unit 123 converts the respective colors of the first decoded input line data FD1 into CMY or CMYK, and subsequently the image rendering unit 122 renders the color converted data to generate one line bit map data RB1 of the image by pixel replication using the rendering one line work buffer RLB. The scaling factor is 2 in X-direction (row direction) and Y-direction (column direction), which means that the destination height time is 2.

At Step S793, since there is no left delta in this line, the delta row decoding unit 121 advances the process to Step S796. At Step S796, the image rendering unit 122 copies the one line bit map data RB1 and replicates or repeats the one line bit map data RB1 in Y-direction, thus generating the rendered rows data RD1 and RD2 in a page buffer PB.

Figure 26:
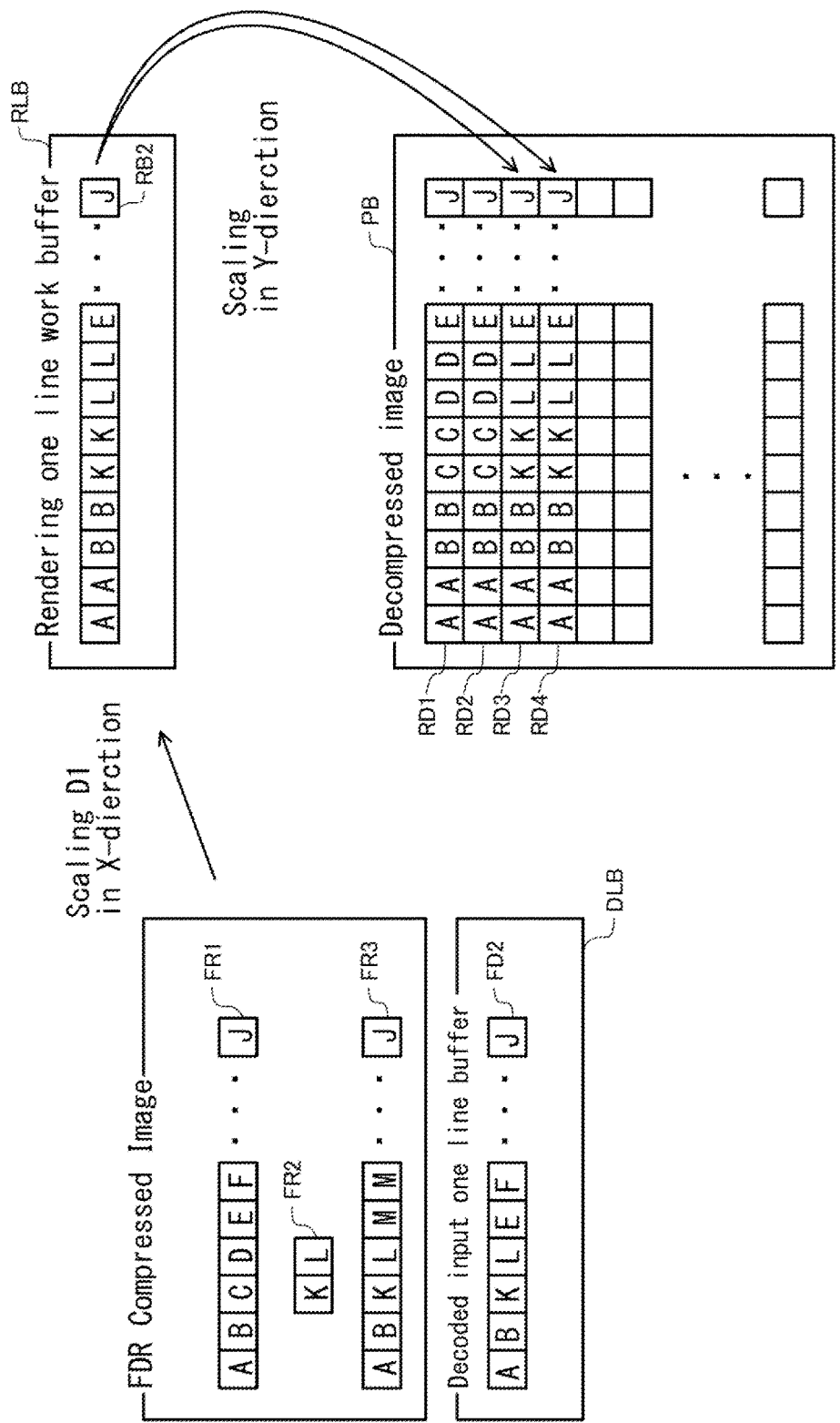
FIG. 26 illustrates a schematic drawing representing the image rendering process according to Embodiment 2.

FIG. 26 illustrates a schematic drawing representing an image rendering process according to Embodiment 2. At Step S797, since there is another line of the second FDR encoded row data FR2. Thus, the delta row decoding unit 121 returns the process to Step S793.

At Step S793, since there is a delta left the second decoded input line data FD2, the delta row decoding unit 121 advances the process to Step S794. At Step S794, the delta row decoding unit 121 updates the third and fourth pixels from "C" and "D" to "K" and "L" to generate the second decoded input line data FD2.

At Step S795, the image processing unit 123 converts the respective colors of the second decoded input line data FD2, and subsequently the image rendering unit 122 renders the color converted data to generate one line bit map data RB2 of the image by pixel replication using the rendering one line work buffer RLB.

At Step S793, since there is no left delta in this line, the delta row decoding unit 121 advances the process to Step S796. At Step S796, the image rendering unit 122 copies the one line bit map data RB2 and replicates or repeats the one line bit map data RB2 in Y-direction, thus generating the rendered rows data RD3 and RD4 in the page buffer PB.

Figure 27:
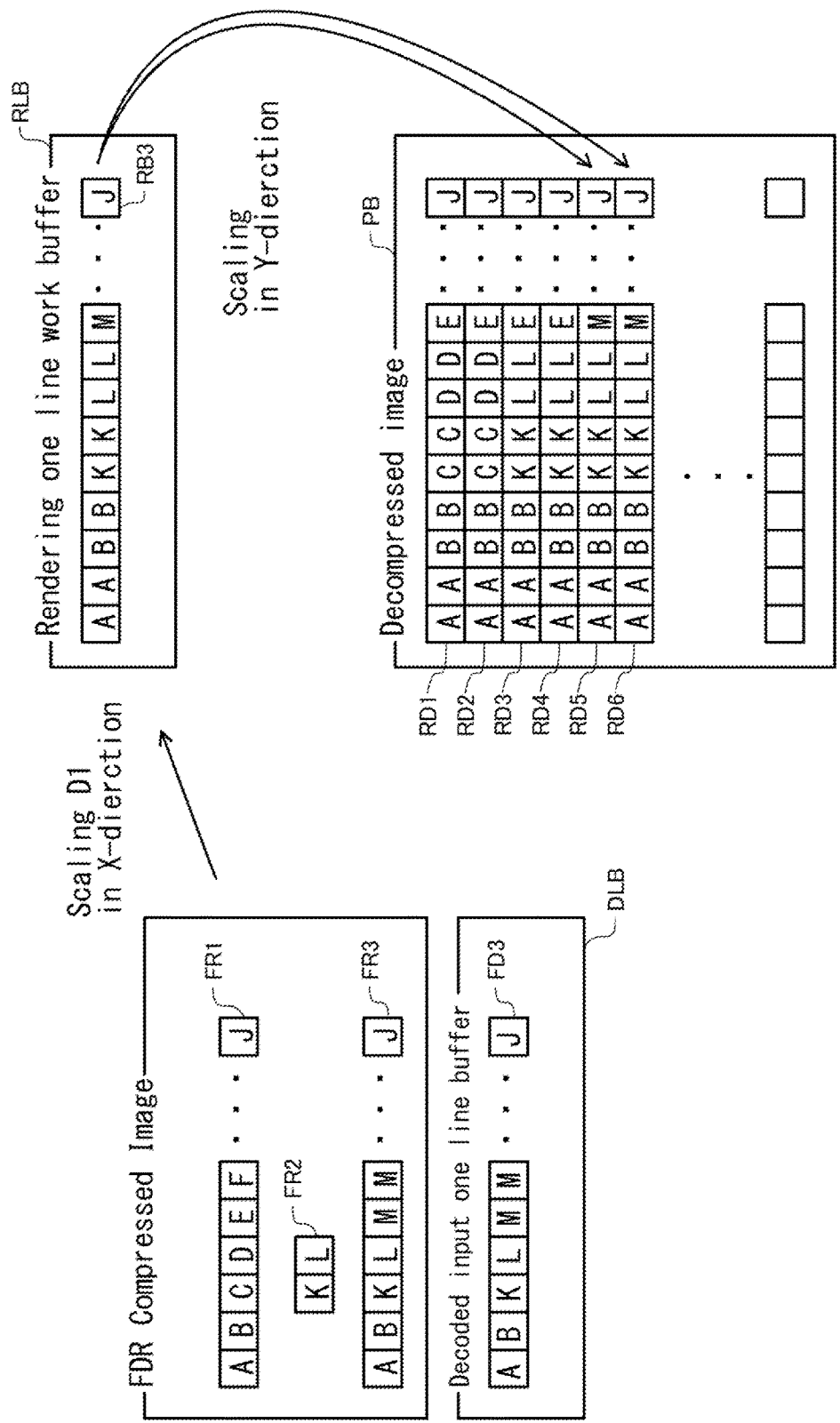
FIG. 27 illustrates a schematic drawing representing the image rendering process according to Embodiment 2.

FIG. 27 illustrates a schematic drawing representing an image rendering process according to Embodiment 2. At Step S797, since there is another line of the third FDR encoded row data FR3. Thus, the delta row decoding unit 121 returns the process to Step S793.

At Step S793, since there is a delta left the second decoded input line data FD2, the delta row decoding unit 121 advances the process to Step S794.

The third FDR encoded row data FR3 has an offset number of zero. The third decoded input line buffer FD3 is generated by simply copying the third FDR encoded row data FR3. The rest of the process is similar to the process for the first decoded input line buffer FD1. Thus, the image rendering unit 122 generates the rendered rows data RD5 and RD6 in the page buffer PB.

As described above, the image forming device 100 according to Embodiment 2 efficiently processes the delta row compressed image data by introducing another intermediate code. This new intermediate code is technically partially decoding or pre-decoding from the delta row compressed image data. This partial decoding process decodes the inefficiently encoded row data, which ends up with low compression ratio and consumes processing power for decoding. Thus, the image forming device 100 according to Embodiment 2 ensures the efficient use of its hardware resource. This pre-decoding process can be performed along with or simultaneously with the parallel processing according to Embodiment 1, which leads to the further enhanced decoding and rendering processing.

Modifications

The disclosure will not be limited to respective embodiments described above, but modifications as follows are also possible.

Modification 1

While in the above-described embodiment the ratio for processing as delta limit is set to 0.25, the ratio may have any other value considering hardware resource including the memory area size and processing power of CPUs.

Modification 2

While in the above-described embodiments and the modification the ratio for processing as delta limit is preliminary set, the ratio may be automatically or semi-automatically changed based the hardware resource including the size of memory area and processing power of CPUs available for the image processing.

While in the above-described embodiments and the modification the parallel delta accumulating process starts accumulation from the second row in the respective row blocks, the parallel delta accumulating process may simply scan the deltas for the last delta in every column of the row data from the last row in the row block. This eliminates the need for replacing process of the deltas and allows omitting any further scan once the last delta is found in each of the columns. The "accumulate" has a broad meaning including the above-described scan.

While in the above-described embodiments and the modification the image data is divided without any overlapped row, the image data may be divided with one overlapped row included in the adjacent two row blocks. For example, the last row in the first block in Embodiment 1 becomes the fifth row while the first row in the third row block becomes the fifth row in this modification. The fifth row becomes the overlapped row. In this case, the obtained last rows in the respective row block may be employed as the last row in the respective row blocks. This eliminates the process for obtaining the first row from the last row.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method using L (L is two or more) processors, comprising:
   receiving, at a computing device, image data encoded by delta row encoding, the image data indicating two dimensionally arranged plurality of pixels, the image data including delta data indicating difference between $N^{th}$ row line and $(N-1)^{th}$ row line in the two dimensionally arranged plurality of pixels;
   dividing the two dimensionally arranged plurality of pixels by M (M equals to L or less) in a column direction to make M blocks of pixels including the first block to $M^{th}$ block;
   assigning M processors to perform a parallel processing of accumulating the delta data for all the row lines of each of the M blocks of the image data to obtain the accumulated delta data, the accumulated delta data including a total delta between the first row line and the last row line in each of the blocks;
   obtaining the first row lines in the respective blocks using the total delta one by one starting from the second block;
   assigning M+1 processers to perform a parallel processing of decoding using the obtained first row lines to obtain the decoded data; and
   assigning M+1 processers to perform a parallel processing of rendering the image data using the decoded data.

2. The method of claim 1, wherein the parallel processing of accumulating includes:
   assigning M+1 processers to each perform a parallel processing of pre-decoding the image data for the $N^{th}$ row line using the delta data if the delta data has a size equal to or larger than a threshold while keeping the image data for the $N^{th}$ row line using the delta data if the delta data has a size smaller than the threshold so as to generate intermediate codes using the computing device; and
   decoding and rendering the kept undecoded lines in the generated intermediate codes while rendering the decoded lines in the generated intermediate codes using the computing device.

3. The method of claim 1, wherein the dividing includes dividing one overlapped row included in the adjacent two row blocks.

4. The method of claim 1, wherein the accumulating includes scanning for the last delta in each of the columns.

5. The method of claim 1, wherein the rendering includes color conversion for the decoded lines.

6. The method of claim 5, wherein the rendering includes scaling for the decoded lines.

7. A computing device, comprising:
   L (L is two or more) processors; and
   a non-transitory data storage storing computer-readable instructions that, when executed by the L processors, cause the computing device to perform functions comprising:
   receiving image data encoded by delta row encoding, the image data indicating two dimensionally arranged plurality of pixels, the image data including delta data indicating difference between $N^{th}$ row line and $(N-1)^{th}$ row line in the two dimensionally arranged plurality of pixels;
   dividing the two dimensionally arranged plurality of pixels by M (M equals to L or less) in a column direction to make M blocks of pixels including the first block to $M^{th}$ block;
   assigning M processors to perform a parallel processing of accumulating the delta data for all the row lines of each of the M blocks of the image data to obtain the accumulated delta data, the accumulated delta data including a total delta between the first row line and the last row line in each of the blocks;
   obtaining the first row lines in the respective blocks using the total delta one by one starting from the second block;
   assigning M+1 processers to perform a parallel processing of decoding using the obtained first row lines to obtain the decoded data; and
   assigning M+1 processers to perform a parallel processing of rendering the image data using the decoded data.

8. The computing device of claim 7, wherein the parallel processing of accumulating includes:
   assigning M+1 processers to each perform a parallel processing of pre-decoding the image data for the $N^{th}$ row line using the delta data if the delta data has a size equal to or larger than a threshold while keeping the image data for the $N^{th}$ row line using the delta data if the delta data has a size smaller than the threshold so as to generate intermediate codes using the computing device; and
   decoding and rendering the kept undecoded lines in the generated intermediate codes while rendering the decoded lines in the generated intermediate codes using the computing device.

9. The computing device of claim 7, wherein the dividing includes dividing one overlapped row included in the adjacent two row blocks.

10. The computing device of claim 7, wherein the accumulating includes scanning for the last delta in each of the columns.

11. The computing device of claim 7, wherein the rendering includes color conversion for the decoded lines.

12. The computing device of claim 11, wherein the rendering includes scaling for the decoded lines.

13. A non-transitory computer-readable recording medium storing computer-readable instructions that, when executed by L (L is two or more) processors, cause a computing device to execute:

receiving image data encoded by delta row encoding, the image data indicating two dimensionally arranged plurality of pixels, the image data including delta data indicating difference between $N^{th}$ row line and $(N-1)^{th}$ row line in the two dimensionally arranged plurality of pixels;

dividing the two dimensionally arranged plurality of pixels by M (M equals to L or less) in a column direction to make M blocks of pixels including the first block to $M^{th}$ block;

assigning M processors to perform a parallel processing of accumulating the delta data for all the row lines of each of the M blocks of the image data to obtain the accumulated delta data, the accumulated delta data including a total delta between the first row line and the last row line in each of the blocks;

obtaining the first row lines in the respective blocks using the total delta one by one starting from the second block;

assigning M+1 processors to perform a parallel processing of decoding using the obtained first row lines to obtain the decoded data; and assigning M+1 processors to perform a parallel processing of rendering the image data using the decoded data.

14. The recording medium of claim 13, wherein the parallel processing of accumulating includes:

assigning M+1 processors to each perform a parallel processing of pre-decoding the image data for the $N^{th}$ row line using the delta data if the delta data has a size equal to or larger than a threshold while keeping the image data for the $N^{th}$ row line using the delta data if the delta data has a size smaller than the threshold so as to generate intermediate codes using the computing device; and decoding and rendering the kept undecoded lines in the generated intermediate codes while rendering the decoded lines in the generated intermediate codes using the computing device.

15. The recording medium of claim 13, wherein the dividing includes dividing one overlapped row included in the adjacent two row blocks.

16. The recording medium of claim 13, wherein the accumulating includes scanning for the last delta in each of the columns.

17. The recording medium of claim 13, wherein the rendering includes color conversion for the decoded lines.

18. The recording medium of claim 17, wherein the rendering includes scaling for the decoded lines.

\* \* \* \* \*